US012556343B2

(12) United States Patent
Zhang et al.

(10) Patent No.: US 12,556,343 B2
(45) Date of Patent: Feb. 17, 2026

(54) METHOD AND APPARATUS FOR HARQ-ACK FEEDBACK IN WIRELESS COMMUNICATION SYSTEM

(71) Applicant: Samsung Electronics Co., Ltd., Gyeonggi-do (KR)

(72) Inventors: Sa Zhang, Beijing (CN); Feifei Sun, Beijing (CN); Jingxing Fu, Beijing (CN)

(73) Assignee: Samsung Electronics Co., Ltd (KR)

( * ) Notice: Subject to any disclaimer, the term of this patent is extended or adjusted under 35 U.S.C. 154(b) by 502 days.

(21) Appl. No.: 17/977,412

(22) Filed: Oct. 31, 2022

(65) Prior Publication Data

US 2023/0155789 A1 May 18, 2023

(30) Foreign Application Priority Data

| Oct. 29, 2021 | (CN) | ......................... 202111272808.1 |
| Nov. 12, 2021 | (CN) | ......................... 202111341453.7 |
| Nov. 26, 2021 | (CN) | ......................... 202111424607.9 |

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1664; H04L 1/1854; H04W 72/0446; H04W 72/232

USPC .......................................................... 370/329
See application file for complete search history.

(56) References Cited

U.S. PATENT DOCUMENTS

| 2019/0268803 | A1  |  8/2019 | He et al. |
| 2021/0058949 | A1* |  2/2021 | Kim ................. H04W 72/1268 |
| 2021/0153228 | A1  |  5/2021 | Shi et al. |
| 2022/0322383 | A1* | 10/2022 | Zewail ................. H04W 72/20 |
| 2023/0189287 | A1* |  6/2023 | Gao ....................... H04L 5/0055 |
|  |  |  | 370/329 |

FOREIGN PATENT DOCUMENTS

| WO | WO 2020/133190 | 7/2020 |
| WO | WO 2021/213384 | 10/2021 |

OTHER PUBLICATIONS

ITRI, "Discussion on multiple PDSCHs scheduled by a DCI", R1-2108010, Aug. 16-27, 2021. (From Applicant's IDS) (Year: 2021).*

(Continued)

*Primary Examiner* — Mang Hang Yeung
(74) *Attorney, Agent, or Firm* — The Farrell Law Firm, P.C.

(57) ABSTRACT

The disclosure relates to a 5G or 6G communication system for supporting a higher data transmission rate. An apparatus in a wireless communication system and a method performed by the same are provided, with the method including receiving a physical downlink control channel (PDCCH), receiving a physical downlink shared channel (PDSCH) based on the received PDCCH, and transmitting hybrid automatic repeat request-acknowledgement (HARQ-ACK) feedback information for the received PDSCH, thereby improving improve communication efficiency.

20 Claims, 10 Drawing Sheets

| Row index | dmrs-TypeA-position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

(56) References Cited

OTHER PUBLICATIONS

3GPP TS 38.213 V16.7.0, 3rd Generation Partnership Project; Technical Specification Group Radio Access Network; NR; Physical Layer Procedures for Control (Release 16), Sep. 2021, 188 pages.
International Search Report dated Feb. 9, 2023 issued in counterpart application No. PCT/KR2022/016739, 7 pages.
ITRI, "Discussion on Multiple PDSCHs Scheduled by a DCI", R1-2108010, 3GPP TSG RAN WG1#106-e, Aug. 16-27, 2021, 7 pages.
European Search Report dated Oct. 28, 2024 issued in counterpart application,No. 22887714.8-1206, 16 pages.
Ericsson, "HARQ-ACK Enhancements for IIoT/URLLC", R1-2100268, 3GPP TSG-RAN WG1 Meeting #104-e, Jan. 25-Feb. 5, 2021, 18 pages.
European Search Report dated Mar. 14, 2025 issued in counterpart application No. 22887714.8-1206, 16 pages.

\* cited by examiner

| Row index | dmrs-TypeA-position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

FIG. 7A

METHOD AND APPARATUS FOR HARQ-ACK FEEDBACK IN WIRELESS COMMUNICATION SYSTEM

CROSS-REFERENCE TO RELATED APPLICATION(S)

This application is based on and claims priority under 35 U.S.C. § 119(a) to Chinese Patent Application No. 202111272808.1, which was filed in the Chinese Intellectual Property Office on Oct. 29, 2021, Chinese Patent Application No. 202111341453.7, which was filed in the Chinese Intellectual Property Office on Nov. 12, 2021, and Chinese Patent Application No. 202111424607.9, which was filed in the Chinese Intellectual Property Office on Nov. 26, 2021, the entire disclosure of each of which is incorporated herein by reference.

BACKGROUND

1. Field

The present disclosure relates generally to the field of wireless communication and, more particularly, to an apparatus in a wireless communication system and a method performed by the same.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

To meet the increasing demand for wireless data communication services since the deployment of fourth generation (4G) communication systems, efforts have been made to develop improved fifth generation (5G) or pre-5G communication systems. Therefore, 5G or pre-5G communication systems are also called beyond 4G networks or post-long term evolution (LTE) systems.

To achieve a higher data rate, 5G communication systems are implemented in higher frequency (millimeter, mmWave) bands, e.g., 60 GHz bands. To reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

SUMMARY

The disclosure has been made to address at least the above-mentioned problems and/or disadvantages and to provide at least the advantages described below. An aspect of the disclosure provides a method performed by a terminal in a wireless communication system. The method includes receiving a physical downlink control channel (PDCCH), receiving a physical downlink shared channel (PDSCH) based on the received PDCCH, and transmitting hybrid automatic repeat request-acknowledgement (HARQ-ACK) feedback information for the received PDSCH.

According to an aspect of the disclosure, there is provided a terminal in a wireless communication system. The terminal includes a transceiver; and a processor coupled to the transceiver. The processor is configured to receive a downlink signal including a physical downlink control channel (PDCCH), receive a physical downlink shared channel (PDSCH) based on the received PDCCH, and transmit hybrid automatic repeat request-acknowledgement (HARQ-ACK) feedback information for the received PDSCH.

According to an embodiment, there is also provided a computer-readable storage medium having one or more computer programs stored thereon, where the one or more computer programs, when executed by one or more processors, can implement any of the methods described above.

BRIEF DESCRIPTION OF THE DRAWINGS

The above and other aspects, features, and advantages of certain embodiments will be more apparent from the following description taken in conjunction with the accompanying drawings, in which: an embodiment

FIGS. 7A and 7B illustrate time domain resource allocation tables according to certain embodiments;

FIG. 8 is a schematic diagram of a value of an extended timing parameter K1 according to an embodiment;

DETAILED DESCRIPTION

Figure 1:
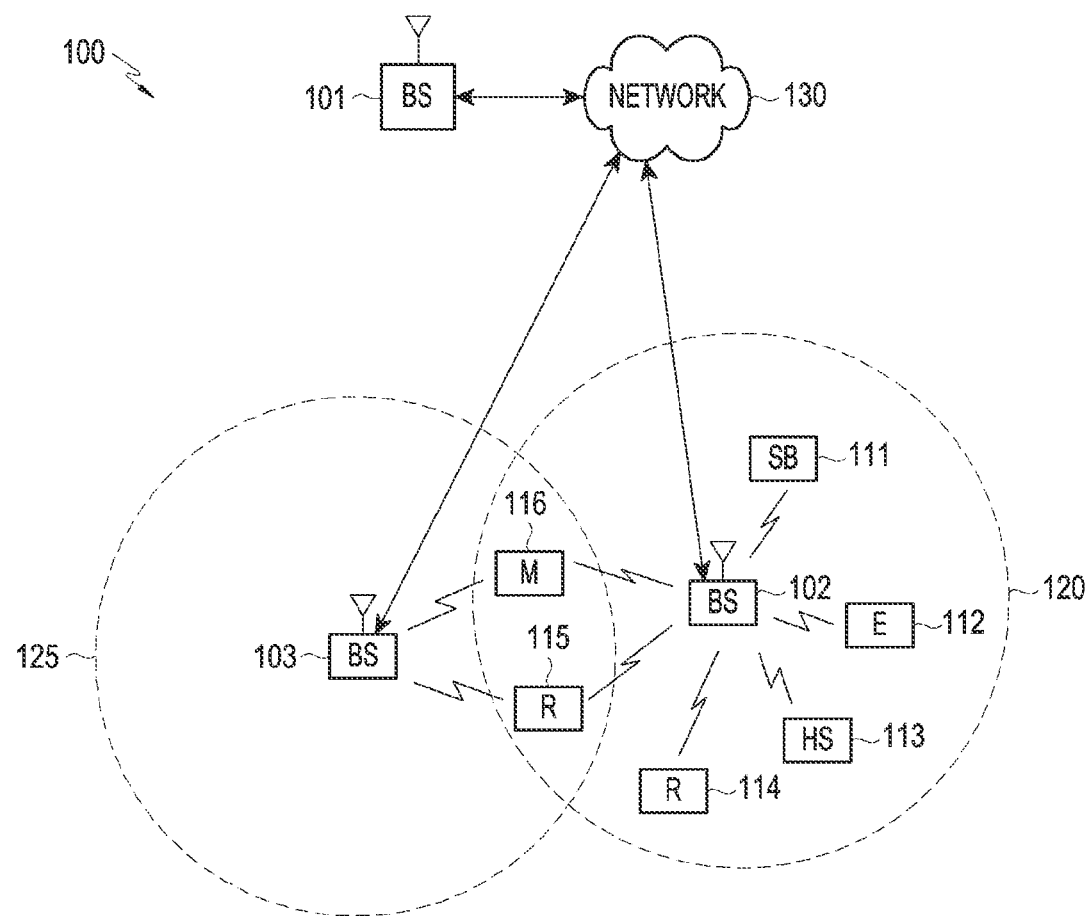
FIG. 1 is a schematic diagram of an example wireless network according to an embodiment.

Set forth below are technical schemes and advantages of the embodiments of the disclosure, with the technical schemes of the embodiments of the disclosure being described with reference to the drawings.

As used herein, the term couple and its derivatives refer to any direct or indirect communication between two or more elements, whether or not those elements are in physical contact with one another. The terms transmit, receive, and communicate, as well as derivatives thereof, encompass both direct and indirect communication. The terms include and comprise, as well as derivatives thereof, mean inclusion without limitation. The term or is inclusive, meaning and/or. The phrase associated with, as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term controller means any device, system or part thereof that controls at least one operation. Such a controller can be implemented in hardware or a combination of hardware and software and/or firmware. The functionality associated with any particular controller can be centralized or distributed, whether locally or remotely. The phrase at least one of, when used with a list of items, means that different combinations of one or more of the listed items can be used, and only one item in the list can be needed. For example, at least one of: A, B, and C includes any of the following combinations: A, B, C, A and B, A and C, B and C, and A and B and C. For example, at least one of: A, B, or C includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms application and program refer to one or more computer programs, software components, sets of instructions, procedures, functions, objects, classes, instances, related data, or a portion thereof adapted for implementation in a suitable computer-readable program code. The phrase computer-readable program code includes any type of computer code, including source code, object code, and executable code. The phrase computer-readable medium includes any type of medium capable of being accessed by a computer, such as read-only memory (ROM), random access memory (RAM), a hard disk drive, a compact disc (CD), a digital video disc (DVD), or any other type of memory. A non-transitory computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe embodiments of the disclosure are not intended to limit and/or define the scope of the present disclosure. Rather, unless otherwise defined, the technical terms or scientific terms used in the disclosure shall have the ordinary meaning understood by those of ordinary skill in the art to which the present disclosure belongs.

It should be understood that first, second and similar words used in the disclosure do not express any order, quantity or importance, but are only used to distinguish different components. Similar words such as singular forms a, an or the do not express a limitation of quantity, but express the existence of at least one of the referenced item, unless the context clearly dictates otherwise. For example, reference to a component surface includes reference to one or more of such surfaces.

As used herein, any reference to an example or example, an implementation or implementation, an embodiment or embodiment means that particular elements, features, structures or characteristics described in connection with the embodiment is included in at least one embodiment. The phrases in one embodiment or in one example appearing in different places do not necessarily refer to the same embodiment.

It will be further understood that similar words such as the term include or comprise mean that elements or objects appearing before the word encompass the listed elements or objects appearing after the word and their equivalents, but other elements or objects are not excluded. Similar words such as connect or connected are not limited to physical or mechanical connection, but can include electrical connection, whether direct or indirect. Upper, lower, left and right are only used to express a relative positional relationship, and when an absolute position of the described object changes, the relative positional relationship may change accordingly.

The various embodiments discussed below for describing the principles of the disclosure are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the present application can be applied to various communication systems, and for example, the communication systems may include global systems for mobile communications (GSM), code division multiple access (CDMA) systems, wideband code division multiple access (WCDMA) systems, general packet radio service (GPRS) systems, LTE systems, LTE frequency division duplex (FDD) systems, LTE time division duplex (TDD) systems, universal mobile telecommunications system (UMTS), worldwide interoperability for microwave access (WiMAX) communication systems, 5G systems or new radio (NR) systems, etc. In addition, the technical schemes of the embodiments of the present application can be applied to future-oriented communication technologies.

When some detailed explanations about functions or configurations may unnecessarily obscure the essence of the disclosure, these detailed explanations will be omitted from the description herein. All terms (including descriptive or technical terms) used herein should be interpreted as having apparent meanings to those of ordinary skill in the art. However, these terms may have different meanings according to the intention of those of ordinary skill in the art, precedents or the emergence of new technologies, and therefore, the terms used herein must be defined based on the meanings of these terms together with the description provided herein. Hereinafter, for example, the base station may be at least one of a gNode B, an eNode B, a Node B, a radio access unit, a base station controller, and a node on a network. The terminal may include a UE, a mobile station (MS), a mobile phone, a smart phone, a computer or multimedia system capable of performing communication functions. In an embodiment, the downlink (DL) may be a wireless transmission path through which signals are transmitted from a base station to a terminal, and the uplink (UL) may be a wireless transmission path through which signals are transmitted from a terminal to a base station.

Hereinafter, the embodiments will be described in detail with reference to the accompanying drawings. It should be noted that the same reference numerals appearing in different drawings will be used to refer to the similar elements.

FIGS. 1 to 3B describe various embodiments implemented by using orthogonal frequency division multiplexing (OFDM) or orthogonal frequency division multiple access (OFDMA) communication technologies in wireless communication systems. The descriptions provided for FIGS. 1 to 3B are not limited to physical or architectural implications for the manner in which different embodiments may be implemented. Different embodiments of the disclosure may be implemented in any suitably arranged communication systems.

FIG. 1 is a schematic diagram of an example wireless network according to an embodiment. In particular, FIG. 1 illustrates an example wireless network 100 according to an embodiment.

The wireless network 100 includes a gNB 101, a gNB 102, and a gNB 103. The gNB 101 communicates with gNB 102 and gNB 103. The gNB 101 also communicates with at least one Internet protocol (IP) network 130, such as the Internet, a private IP network, or other data networks.

Depending on a type of the network, other well-known terms such as base station (BS) or access point can be used instead of gNodeB or gNB. For convenience, the terms gNodeB and gNB are used to refer to network infrastructure components that provide wireless access for remote terminals. And, depending on the type of the network, other well-known terms such as mobile station, user station, remote terminal, wireless terminal or user apparatus can be used instead of user equipment or UE. For example, the terms terminal, user equipment and UE may be used to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of UEs within a coverage area 120 of the gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The GNB 103 provides wireless broadband access to network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, LTE, LTE-A, WiMAX or other advanced wireless communication technologies.

The dashed lines in FIG. 1 show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

One or more of gNB 101, gNB 102, and gNB 103 include a two-dimensional (2D) antenna array. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
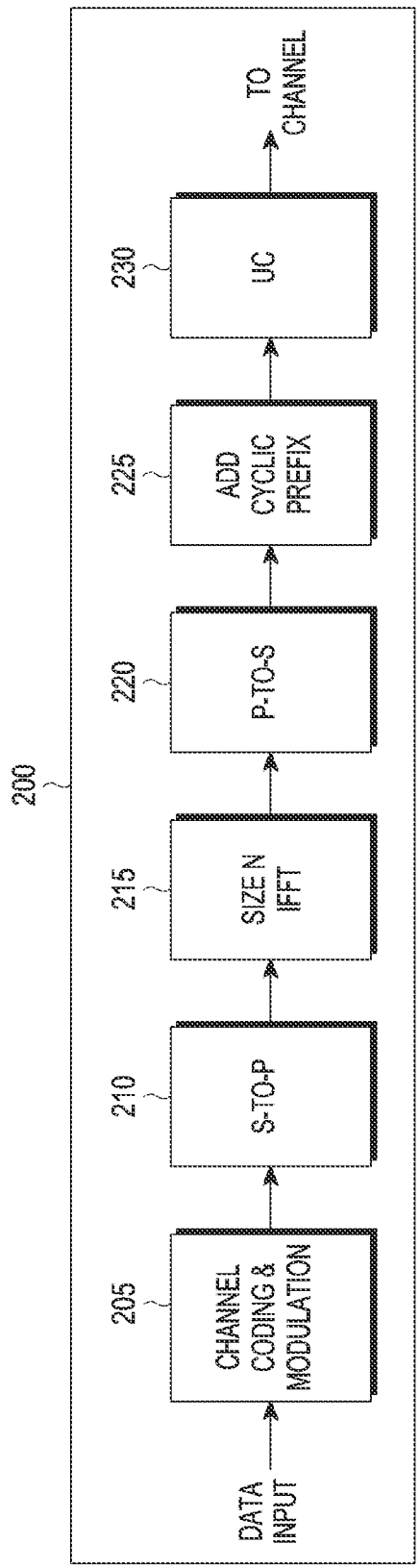
FIGS. 2A and 2B illustrate wireless transmission and reception paths according to an embodiment.
Figure 2B:
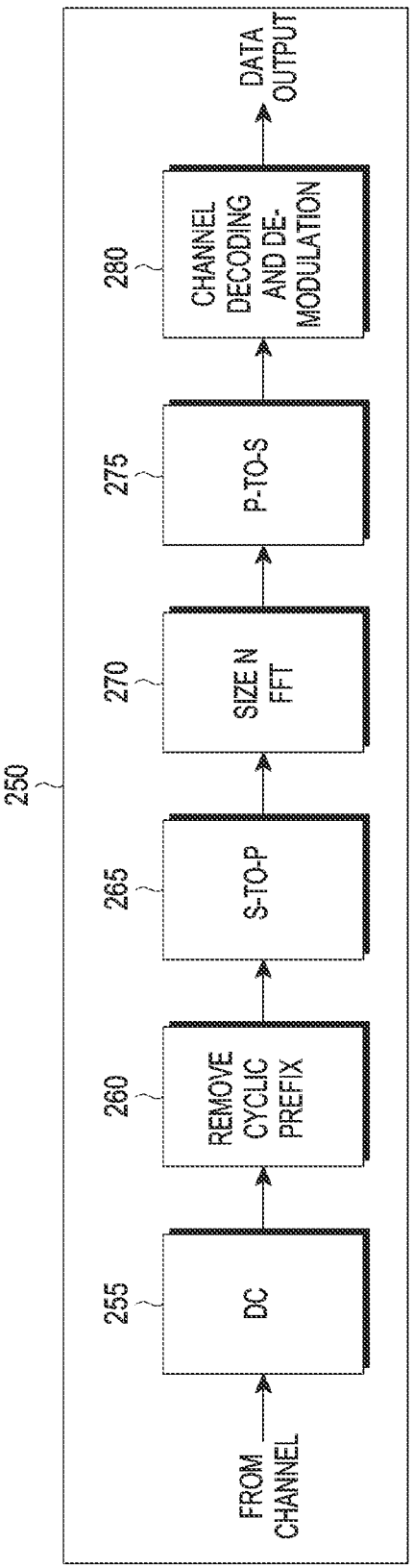

FIGS. 2A and 2B illustrate wireless transmission and reception paths according to an embodiment. In the following description, transmission path 200 can be described as being implemented in a gNB, such as gNB 102, and reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N Fast Fourier Transform (FFT) block 270, a P-to-S block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The S-to-P block 210 converts (e.g., demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The P-to-S block 220 converts (e.g., multiplexes) parallel time domain output symbols from the size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at gNB 102 are performed at the UE 116. The down-converter 255 down-converts the received signal to a baseband frequency, and the cyclic prefix removal block 260 removes the cyclic prefix to generate a serial time domain baseband signal. The S-to-P block 265 converts the time domain baseband signal into a parallel time domain signal. The size N FFT block 270 performs an FFT algorithm to generate N parallel frequency-domain signals. The P-to-S block 275 converts the parallel frequency-domain signal into a sequence of modulated data symbols. The channel decoding and demodulation block 280 demodulates and decodes the modulated symbols to recover the original input data stream.

Each of the gNBs 101-103 may implement a transmission path 200 similar to that for transmitting to UEs 111-116 in the downlink, and may implement a reception path 250 similar to that for receiving from UEs 111-116 in the uplink. Similarly, each of the UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
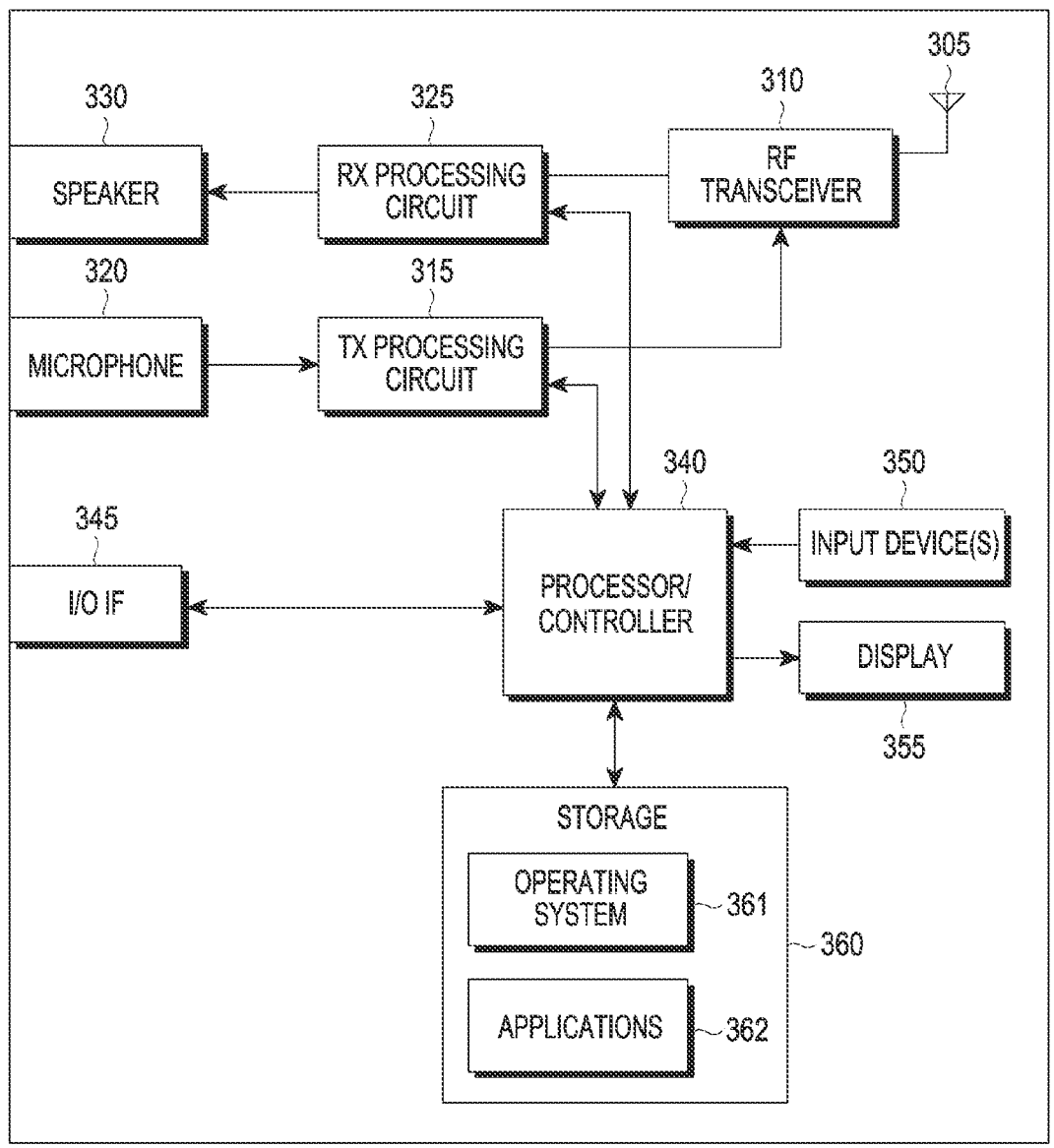
FIG. 3A illustrates components of a user equipment (UE) according to an embodiment.

FIG. 3A illustrates components of a UE 116 according to an embodiment. The embodiment of UE 116 shown in FIG. 3A is for illustration only, and the UEs 111-115 of FIG. 1 can have the same or similar configuration.

The UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 to control the overall operation of UE 116. For example, the processor/controller 340 may control the reception of forward channel signals and the transmission of backward channel signals through the RF transceiver 310, the RX processing circuit 325 and the TX processing circuit 315. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 is configured to move data into or out of the memory 360 as required by an execution process. In some embodiments, the processor/controller 340 is configured to execute the application 362 based on the OS 361 or in response to signals received from the gNB or the operator. The processor/controller 340 is coupled to an I/O interface 345, which provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (e.g., from a website). The memory 360 is coupled to the processor/controller 340. A part of the memory 360 can include a RAM, while another part of the memory 360 can include a flash memory or other ROM.

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Although FIG. 3A illustrates that the UE 116 is configured as a mobile phone or a smart phone, UEs can be configured to operate as other types of mobile or fixed devices.

Figure 3B:
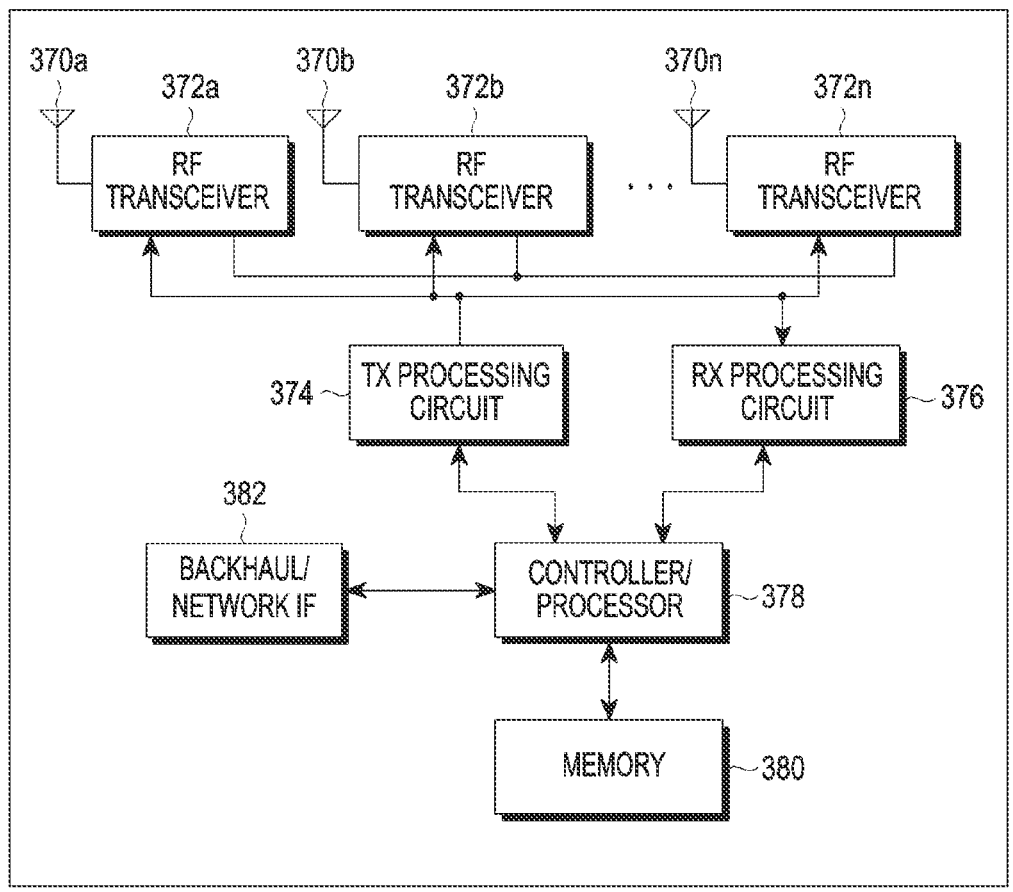
FIG. 3B illustrates components of a gNodeB (gNB) according to an embodiment.

FIG. 3B illustrates an example the gNB 102 according to an embodiment. The embodiment of the gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that the gNB 101 and the gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

The RF transceivers 372a-372n receive an incoming RF signal from the antennas 370a-370n, such as a signal transmitted by UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. The RX processing circuit 376 transmits the processed baseband signal to controller/processor 378 for further processing.

The TX processing circuit 374 receives analog or digital data (e.g., voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from TX processing circuit 374 and up-convert the baseband or IF signal into an RF signal transmitted via the antennas 370a-370n.

The controller/processor 378 may include one or more processors or other processing devices that control the overall operation of gNB 102. For example, the controller/processor 378 may control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. The controller/processor 378 may support any of a variety of other functions in The gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

The transmission and reception paths of the gNB 102 (implemented using the RF transceivers 372a-372n, the TX processing circuit 374 and/or the RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that terminal and terminal device, as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a personal communications service (PCS), which may combine voice, data processing, fax and/or data communication capabilities; a personal digital assistant (PDA)), which may include a radio frequency receiver, a pager, an internet/intranet access, a web browser, a notepad, a calendar and/or a global positioning system (GPS) receiver; a conventional laptop and/or palmtop computer or other devices having and/or including a radio frequency receiver. Terminal and terminal device as used herein may be portable, transportable, installed in vehicles (aviation, sea transportation and/or land), or suitable and/or configured to operate locally, and/or in distributed form, operate on the earth and/or any other position in space. Terminal and terminal device as used herein may also be a communication terminal, an Internet terminal, a music/video playing terminal, such as a PDA, a mobile Internet device (MID) and/or a mobile phone with music/video playing functions, a smart TV, a set-top box and other devices.

The rapid development of information industry, especially the increasing demand from mobile Internet and the Internet of things (IoT) brings unprecedented challenges to the future mobile communication technology. According to the report of International Telecommunication Union (ITU) ITU-R M, it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. To meet the unprecedented challenges, the communication industry and academia have carried out extensive research on the 5G mobile communication technology to face the 2020s. At present in ITU report ITU-R M, the framework and overall goals of the future 5G has been discussed, in which the demand outlook, application scenarios and important performance indicators of 5G are described in detail. With respect to new requirements in 5G, ITU report ITU-R M provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In the 3rd Generation Partnership Project (3GPP), the first stage of 5G is already in progress. To support more flexible scheduling, the 3GPP decides to support variable hybrid automatic repeat request-acknowledgement (HARQ-ACK) feedback delay in 5G. In existing LTE systems, a time from reception of downlink data to uplink transmission of HARQ-ACK is fixed. For example, in FDD systems, the delay is 4 subframes. In TDD systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios; enhanced mobile broadband (eMBB), massive machine-type communication (mMTC), and ultra-reliable and low-latency communication (URLLC). The eMBB scenario aims to further improve data transmission rate on the basis of the existing mobile broadband service scenario, to enhance user experience and pursue ultimate communication experience between people. mMTC and URLLC are, for example, the application scenarios of the IoT, but their respective emphases are different: mMTC being mainly information interaction between people and things, while URLLC mainly reflecting communication requirements between things.

In 5G, the UE can support a flexible numerology, a larger bandwidth and more flexible scheduling. When a sub-carrier spacing (SCS) is large, an absolute time of a slot will be small. Slot-based scheduling will cause large downlink control information (DCI) overhead. To reduce the DCI overhead, a DCI can be used to schedule multiple PDSCHs and/or physical uplink shared channels (PUSCHs). When the SCS is large, a slot of a PUCCH can be divided into multiple subslots, and HARQ-ACK can be fed back in time units of subslots, thus reducing the latency of the HARQ-ACK. In different configuration scenarios, how to design the method of HARQ-ACK feedback for a PDSCH is an urgent problem to be solved.

To solve at least the above technical problems, embodiments of the disclosure provide a method performed by a terminal, the terminal, a method performed by a base station and the base station in a wireless communication system, and a non-transitory computer-readable storage medium.

In embodiments of the disclosure, for the convenience of description, a first transceiving node and a second transceiving node are defined. For example, the first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Figure 4:
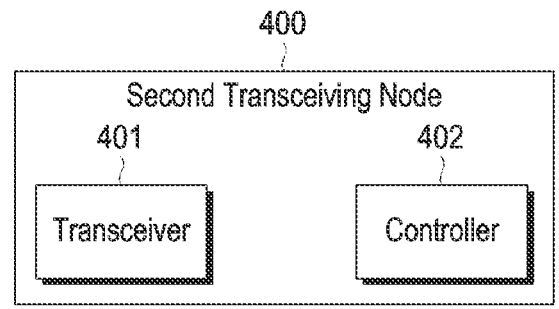
FIG. 4 is a block diagram of a second transceiving node according to an embodiment.

FIG. 4 is a block diagram of the second transceiving node according to an embodiment.

Referring to FIG. 4, the second transceiving node 400 may include a transceiver 401 and a controller 402.

The transceiver 401 may be configured to receive first data and/or first control signaling from the first transceiving node, and transmit second data and/or second control signaling to the first transceiving node in a determined time unit.

The controller 402 may be an application specific integrated circuit or at least one processor. The controller 402 may be configured to control the overall operation of the second transceiving node and control the second transceiving node to implement the methods proposed in the embodiments of the disclosure. For example, the controller 402 may be configured to determine the second data and/or the second control signaling, and a time unit for transmitting the second data and/or the second control signaling based on the first data and/or the first control signaling, and control the transceiver 401 to transmit the second data and/or the second control signaling to the first transceiving node in the determined time unit.

In some embodiments, the controller 402 may be configured to perform one or more operations in methods of various embodiments described below. For example, the controller 402 may be configured to perform one or more of operations in a method 500 to be described later in connection with FIG. 5 and/or a method 1000 described in connection with FIG. 10.

In some embodiments, the first data may be data transmitted by the first transceiving node to the second transceiving node. In the following examples, downlink data carried by a PDSCH is taken as an example, but not limited thereto, to illustrate the first data.

In some embodiments, the second data may be data transmitted by the second transceiving node to the first transceiving node. In the following examples, uplink data carried by a PUSCH (is taken as an example to illustrate the second data, but not limited thereto.

In some embodiments, the first control signaling may be control signaling transmitted by the first transceiving node to the second transceiving node. In the following examples, downlink control signaling is taken as a non-limiting example to illustrate the first control signaling. The downlink control signaling may be DCI carried by a PDCCH and/or control signaling carried by a PDSCH. For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

In some embodiments, the second control signaling may be control signaling transmitted by the second transceiving node to the first transceiving node. In the following examples, uplink control signaling is taken as an example (but is not limited thereto) to illustrate the second control signaling. The uplink control signaling may be uplink control information (UCI) carried by a PUCCH and/or control signaling carried by a PUSCH. A type of UCI may include one or more of: HARQ-ACK information, scheduling request (SR), link recovery request (LRR), channel state information (CSI) or configured grant (CG) UCI.

In some embodiments, a PUCCH carrying SR may be a PUCCH carrying positive SR and/or negative SR.

In some embodiments, the CSI may also be Part 1 CSI and/or Part 2 CSI.

In some embodiments, a first time unit is a time unit in which the first transceiving node transmits the first data and/or the first control signaling. In the following non-limiting examples, a downlink time unit is taken as an example to illustrate the first time unit.

In some embodiments, a second time unit is a time unit in which the second transceiving node transmits the second data and/or the second control signaling. In the following non-limiting examples, an uplink time unit is taken as an example to illustrate the second time unit.

In some embodiments, the first time unit and the second time unit may be one or more slots, one or more subslots, one or more OFDM symbols, or one or more subframes.

Herein, depending on the network type, the term base station or BS can refer to any component (or a set of components) configured to provide wireless access to a network, such as a transmission point (TP), a transmission and reception point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP NR interface/access, LTE, LTE advanced (LTE-A), high speed packet access (HSPA), Wi-Fi 802.11a/b/g/n/ac, etc.

In describing a wireless communication system, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via radio resource control (RRC) signaling, packet data convergence protocol (PDCP) signaling, or a medium access control (MAC) control element (MAC CE).

Figure 5:
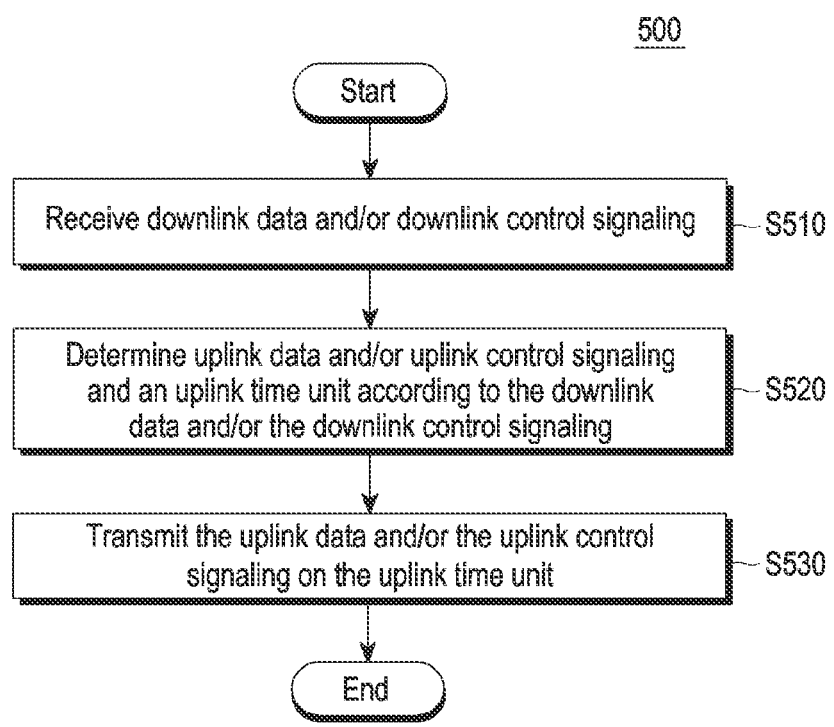
FIG. 5 is a flowchart of a method performed by a UE according to an embodiment.

FIG. 5 is a flowchart of a method performed by a UE according to an embodiment.

Referring to FIG. 5, in step S510, the UE may receive downlink data (e.g., downlink data carried by a PDSCH) and/or downlink control signaling from a base station. For example, the UE may receive the downlink data and/or the downlink control signaling from the base station based on predefined rules and/or received configuration parameters.

In step S520, the UE determines uplink data and/or uplink control signaling and an uplink time unit based on the downlink data and/or downlink control signaling.

In step S530, the UE transmits the uplink data and/or the uplink control signaling to the base station in an uplink time unit.

In some embodiments, acknowledgement/negative acknowledgement (ACK/NACK) for downlink transmissions may be performed through HARQ-ACK.

Figure 6A:
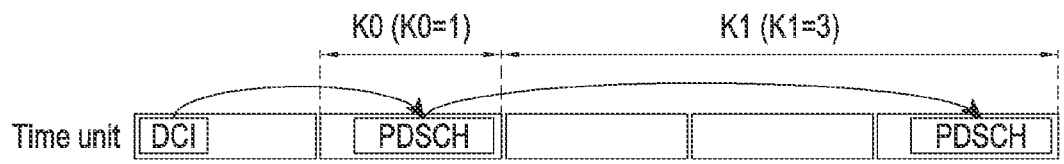
FIGS. 6A-6C illustrate examples of uplink transmission timing according to certain embodiments.
Figure 6B:
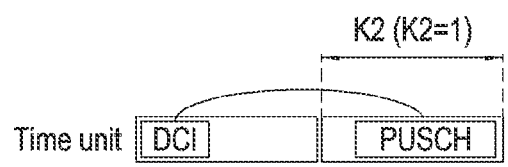
Figure 6C:
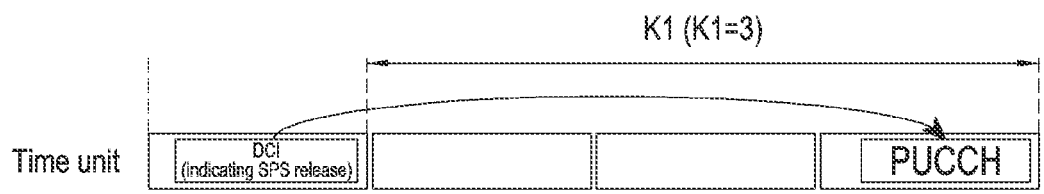

In some embodiments, the downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 6A-6C. FIGS. 6A-6C illustrate examples of uplink transmission timing according to certain embodiments.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. FIG. 6A provides an example in which K0=1. In the example illustrated in FIG. 6A, the time interval from the PDSCH scheduled by the DCI to the PDCCH carrying the DCI is one slot.

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot.

In yet another example, the UE receives the PDSCH, and may transmit HARQ-ACK information for the PDSCH in a PUCCH in the uplink time unit. For example, a timing parameter (which may also be referred to as a timing value) K1 (e.g., the parameter dl-DataToUL-ACK in 3GPP) may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH.

FIG. 6A provides an example in which K1=3. In the example illustrated in FIG. 6A, the time interval between the PUCCH for transmitting the HARQ-ACK information for the PDSCH and the PDSCH is 3 slots. It should be noted that in embodiments of the disclosure, the timing parameter K1 may be used interchangeably with a timing parameter $K_1$, the timing parameter K0 may be used interchangeably with a timing parameter $K_0$, and the timing parameter K2 may be used interchangeably with a timing parameter $K_2$.

The PDSCH may be a PDSCH scheduled by the DCI and/or an SPS PDSCH. The UE will periodically receive the SPS PDSCH after the SPS PDSCH is activated by the DCI. In examples of the disclosure, the SPS PDSCH may be equivalent to a PDSCH not scheduled by the DCI/PDCCH. After the SPS PDSCH is released (deactivated), the UE will no longer receive the SPS PDSCH.

In yet another example, the UE receives the DCI (e.g., DCI indicating SPS (semi-persistent scheduling) PDSCH release (deactivation)), and may transmit HARQ-ACK information for the DCI in the PUCCH in the uplink time unit. For example, the parameter K1 may be used to represent a time interval between the PUCCH for transmitting the HARQ-ACK information for the DCI and the DCI, and K1 may be in units of uplink time units, such as slots or subslots.

FIG. 6C provides an example in which K1=3. In the example of FIG. 6C, the time interval between the PUCCH for transmitting the HARQ-ACK information for the DCI and the DCI is 3 slots. For example, the parameter K1 may be used to represent a time interval between a SPS PDSCH reception and the PUCCH feeding back HARQ-ACK for the SPS PDSCH reception, where K1 is indicated in DCI activating the SPS PDSCH. In some embodiments, in step S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In some embodiments, the base station may configure higher layer signaling for the UE based on a UE capability previously received from the UE (for example, in step S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In some embodiments, downlink channels (downlink resources) may include PDCCHs and/or PDSCHs. Uplink channels (uplink resources) may include PUCCHs and/or PUSCHs.

In some embodiments, the UE may be configured with two levels of priorities for uplink transmission. For example, the two levels of priorities may include a first priority and a second priority which are different from each other. In an example, the first priority may be higher than the second priority. In another example, the first priority may be lower than the second priority. However, embodiments of the disclosure are not limited to this, and for example, the UE may be configured with more than two levels of priorities. For the sake of convenience, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In some embodiments, the UE may be configured with a subslot-based PUCCH transmission. For example, a subslot length parameter (which may also be referred to as a parameter related to a subslot length in embodiments of the disclosure) (e.g., the parameter subslotLengthForPUCCH in 3GPP) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L (L is the configured subslot configuration length) OFDM symbols.

The mechanism of slot-based PUCCH transmissions is basically the same as that of subslot-based PUCCH transmissions. In the disclosure, a slot may be used to represent a PUCCH occasion unit. For example, if the UE is configured with subslots, a slot which is a PUCCH occasion unit may be replaced with a subslot. For example, it may be specified by protocols that if the UE is configured with the subslot length parameter (e.g., the parameter subslotLength-ForPUCCH in 3GPP), unless otherwise indicated, a number of symbols contained in the slot of the PUCCH transmission is indicated by the subslot length parameter.

If the UE is configured with the subslot length parameter, and subslot n is the last uplink subslot overlapping with a PDSCH reception or PDCCH reception (e.g., for SPS PDSCH release, and/or indicating secondary cell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). As another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where K is determined by the timing parameter K1.

Unicast may refer to a manner in which a network communicates with a UE, and multicast/broadcast may refer to a manner in which a network communicates with multiple UEs. For example, a unicast PDSCH may be a PDSCH received by a UE, and the scrambling of the PDSCH may be based on a radio network temporary identifier (RNTI) specific to the UE, e.g., a cell-RNTI (C-RNTI). The unicast PDSCH may also be a unicast SPS PDSCH. A multicast/broadcast PDSCH may be a PDSCH received by more than one UE simultaneously, and the scrambling of the multicast/broadcast PDSCH may be based on a UE-group common RNTI. For example, the UE-group common RNTI for scrambling the multicast/broadcast PDSCH may include an RNTI (referred to as G-RNTI herein) for scrambling of a dynamically scheduled multicast/broadcast transmission (e.g., PDSCH) or an RNTI (referred to as G-CS-RNTI in embodiments of the disclosure) for scrambling of a multicast/broadcast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast (or groupcast)/broadcast PDSCH may include HARQ-ACK information for the multicast/broadcast PDSCH. In embodiments of the disclosure, the terms multicast/broadcast may refer to at least one of multicast or broadcast.

In some embodiments, a HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. The positive ACK may be represented by 1 in the HARQ-ACK codebook, for example. If a PDSCH is not successfully decoded, the HARQ-ACK information for this PDSCH is negative ACK (NACK). NACK may be represented by 0 in the HARQ-ACK codebook, for example. For example, the UE may generate the HARQ-ACK codebook based on the pseudo code specified by protocols. In an example, if the UE receives a DCI format that indicates SPS PDSCH release (deactivation), the UE transmits HARQ-ACK information (ACK) for the DCI format. In another example, if the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. To reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, if the UE receives a DCI format that schedules a PDSCH, the UE transmits HARQ-ACK information for the PDSCH. In yet another example, the UE receives a SPS PDSCH, and the UE transmits HARQ-ACK information for the SPS PDSCH reception. In yet another example, if the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., OFDM symbol) of the UE in a semi-static frame structure configured by higher layer signaling overlaps with a symbol of a SPS PDSCH, the UE does not receive the SPS PDSCH. In yet another example, if the UE is configured by higher layer signaling to receive a SPS PDSCH according to a predefined rule, the UE transmits HARQ-ACK information for the SPS PDSCH reception. It should be noted that in embodiments of the disclosure, A overlaps with B may mean that A at least partially overlaps with B. That is, A overlaps with B includes a case where A completely overlaps with B.

In some embodiments, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information according to a rule for generating a SPS PDSCH HARQ-ACK codebook.

In some embodiments, if HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ- ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter PDSCH-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

In some embodiments, if HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code for generating a HARQ-ACK codebook for a SPS PDSCH reception defined in 3GPP).

The semi-static HARQ-ACK codebook (e.g., 3GPP TS 38.213 Type-1 HARQ-ACK codebook) may determine the size of the HARQ-ACK codebook and an order of HARQ-ACK bits according to a semi-statically parameter (e.g., a parameter configured by higher layer signaling). For a serving cell c, an active downlink bandwidth part (BWP) and an active uplink BWP, the UE determines a set of $M_{A,c}$ occasions for candidate PDSCH receptions for which the UE can transmit corresponding HARQ-ACK information in a PUCCH in an uplink slot $n_U$.

$M_{A,c}$ may be determined by at least one of:
a) HARQ-ACK slot timing values K1 of the active uplink BWP;
b) a downlink time domain resource allocation (TDRA) table;
c) an uplink SCS configuration and a downlink SCS configuration;
d) a semi-static uplink and downlink frame structure configuration;
e) a downlink slot offset parameter (e.g., 3GPP parameter $N_{slot,offset,c}^{DL}$) for the serving cell c and its corresponding slot offset SCS (e.g., 3GPP parameter $\mu_{offset,DL,c}$), and a slot offset parameter (e.g., 3GPP parameter $N_{slot,offset}^{UL}$) for a primary serving cell and its corresponding slot offset SCS (e.g., 3GPP parameter $\mu_{offset,UL}$).

The parameter K1 is used to determine a candidate uplink slot, and candidate downlink slots are then determined according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in time domain; or (ii) if the time unit of the PUCCH is a slot, the end of the candidate downlink slots overlap with the candidate uplink slot in time domain.

A number of PDSCHs in a candidate downlink slot for which HARQ-ACK needs to be fed back is determined by a maximum value of a number of non-overlapping valid PDSCHs in the downlink slot, e.g., the valid PDSCHs may be PDSCHs that do not overlap with semi-statically configured uplink symbols. Time domain resources occupied by the PDSCHs may be determined by: (i) a time domain resource allocation table configured by higher layer signaling (also referred to as a table associated with time domain resource allocation) and (ii) a certain row in the time domain resource allocation table dynamically indicated by DCI. Each row in the time domain resource allocation table may define information related to time domain resource allocation. For example, for the time domain resource allocation table, an indexed row defines a timing value (e.g., time unit (e.g., a slot) offset (e.g., K0)) between a PDCCH and a PDSCH, and a start and length indicator value (SLIV), or directly defines a start symbol and allocation length. For example, for the first row of the time domain resource allocation table, a start OFDM symbol is 0 and an OFDM symbol length is 4; for the second row of the time domain resource allocation table, the start OFDM symbol is 4 and the OFDM symbol length is 4; and for the third row of the time domain resource allocation table, the start OFDM symbol is 7 and the OFDM symbol length is 4. The DCI for scheduling the PDSCH may indicate any row in the time domain resource allocation table. When all OFDM symbols in the downlink slot are downlink symbols, the maximum value of the number of non-overlapping valid PDSCHs in the downlink slot is 2. At this time, the Type-1 HARQ-ACK codebook needs to feed back HARQ-ACK information for two PDSCHs in the downlink slot of the serving cell.

Figures 7B, 8:
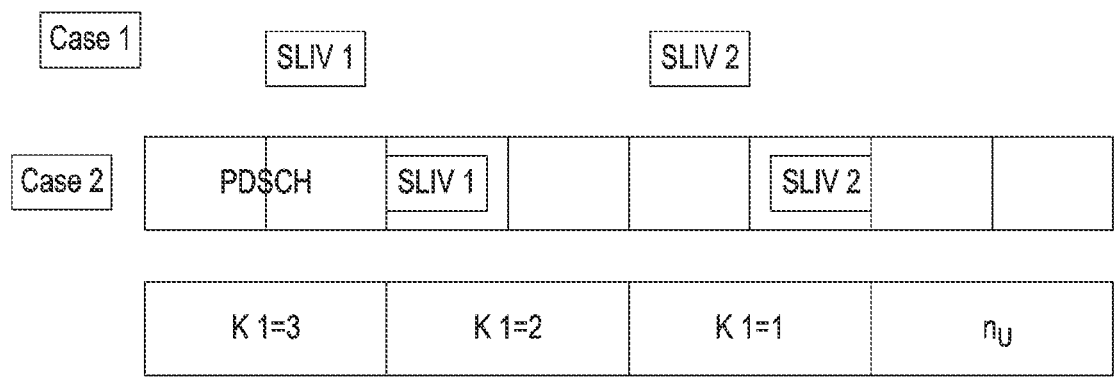

FIGS. 7A and 7B illustrate time domain resource allocation tables according to certain embodiments. Specifically, FIG. 7A illustrates a time domain resource allocation table in which one PDSCH is scheduled by one row, and FIG. 7B illustrates a time domain resource allocation table in which multiple PDSCHs are scheduled by one row. Referring to FIG. 7A, each row corresponds to a value of a timing parameter K0, a value of S indicating a start symbol, and a value of L indicating a length, where an SLIV may be determined by the value of S and the value of L. Referring to FIG. 7B, unlike FIG. 7A, each row corresponds to values of multiple sets of {K0, S, L}.

In some embodiments, the dynamic HARQ-ACK codebook and/or the enhanced dynamic HARQ-ACK codebook may determine a size and an order of the HARQ-ACK codebook according to an assignment indicator. For example, the assignment indicator may be a downlink assignment indicator (DAI). In the following embodiments, the assignment indicator as the DAI is taken as an example for illustration. However, the embodiments of the disclosure are not limited thereto, and any other suitable assignment indicator may be adopted.

In some embodiments, a DAI field includes at least one of a first DAI and a second DAI.

In some examples, the first DAI may be a counter-DAI (C-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to:
a. an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or
b. an accumulative number of PDCCH(s) up to the current time unit; or
c. an accumulative number of PDSCH transmission(s) up to the current time unit; or
d. an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or e. an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or f. an accumulative number of PDSCHs (the PDSCHs are PDSCHs with corresponding PDCCHs) already scheduled by the base station up to the current serving cell and/or the current time unit; or g. an accumulative number of time units with PDSCH transmissions (the PDSCHs are PDSCHs with corresponding PDCCHs) already scheduled by the base station up to the current serving cell and/or the current time unit.

The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In some examples, the second DAI may be a total-DAI (T-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to:

a. a total number of {serving cell, time unit} pairs scheduled by PDCCH(s) up to the current time unit within a time window (which may also include a number of PDCCHs for indicating SPS release); or b. a total number of PDSCH transmissions up to the current time unit; or c. a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or d. a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or e. a total number of PDSCHs (the PDSCHs are PDSCHs with corresponding PDCCHs) already scheduled by the base station up to the current serving cell and/or the current time unit; or f. a total number of time units with PDSCH transmissions (for example, the PDSCHs are PDSCHs with corresponding PDCCHs) already scheduled by the base station up to the current serving cell and/or the current time unit.

The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2, below, show a correspondence between the DAI field and $V_{T-DAI,m}$ or $V_{C-DAI,c,m}$. The numbers of bits of the C-DAI and T-DAI are limited.

For example, where the C-DAI or T-DAI is represented with 2 bits, the value of the C-DAI or T-DAI in the DCI may be determined by the equations in Table 1. $V_{T-DAI,m}$ is the value of the T-DAI in DCI received in a PDCCH Monitoring Occasion (MO) m, and $V_{C-DAI,c,m}$ is the value of the C-DAI in DCI for a serving cell c received in the PDCCH monitoring occasion m. Both $V_{T-DAI,m}$ and $V_{C-DAI,c,m}$ are related to a number of bits of the DAI field in the DCI. MSB and LSB are the most significant bit and the least significant bit, respectively.

TABLE 1

| MSB, LSB of DAI Field | $V_{T-DAI,m}$ or $V_{C-DAI,c,m}$ | Y |
| --- | --- | --- |
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "00", and the value of $V_{T-DAI,m}$ or $V_{C-DAI,c,m}$ is represented as "1" by the equations in Table 1. Y may represent the value of the DAI corresponding to the number of DCIS actually transmitted by the base station (the value of the DAI before conversion by the equations in Table 1).

For example, where the C-DAI or T-DAI in the DCI is 1 bit, values greater than 2 may be represented by the equations in Table 2.

TABLE 2

| DAI field | $V_{T-DAI,m}$ or $V_{C-DAI,c,m}$ | Y |
| --- | --- | --- |
| 0 | 1 | (Y − 1) mod 2 + 1 = 1 |
| 1 | 2 | (Y − 1) mod 2 + 1 = 2 |

In some embodiments, if a PDSCH HARQ-ACK codebook configuration parameter (e.g., the parameter pdsch-HARQ-ACK-Codebook) is configured to be semi-static (e.g., semi-static), the UE generates a HARQ-ACK codebook according to a rule of a semi-static HARQ-ACK codebook (e.g., 3GPP TS 38.213 Type-1 HARQ-ACK codebook). When the semi-static HARQ-ACK codebook is determined, it is necessary to determine candidate downlink slots according to a set of timing values K1. The definition of K1 is different for slot-based PUCCH transmission and subslot-based PUCCH transmission, and the above factors need to be considered when designing the HARQ-ACK codebook.

For a certain serving cell c, an active downlink BWP and an active uplink BWP, the UE determines a set of $M_{A,c}$ occasions for candidate PDSCH receptions for which the UE transmits corresponding HARQ-ACK information in a PUCCH in an uplink slot $n_U$. The set of $M_{A,c}$ occasions may be determined according to one of the steps S1 to S4, as set forth below.

Step S1: determining candidate uplink slots. For example, the candidate uplink slots may include a slot that satisfies a first predefined condition. The first predefined condition may include at least one of:

a) Condition COND1: $\mod(n_U - K_{1,max} + 1, \max(2^{\mu_{UL} - \mu_{DL}}, 1)) = 0$, and for any serving cell of PDSCH receptions and the PUCCH transmission (e.g., the PUCCH containing HARQ-ACK information), UE is not configured with a carrier aggregation slot offset parameter (e.g., 3GPP parameter ca-SlotOffset). $n_U$ is an uplink slot index, $K_{1,k}$ is a slot timing value, k is an index of an entry in the set of slot timing values $K_1$, $\mu_{UL}$ is an uplink SCS configuration parameter and $\mu_{DL}$, is a downlink SCS configuration parameter.

b) Condition COND2:

$$\text{mod}\left(n_U - K_{1,k} + \left[\left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}}\right] + 1,\right.$$

$$\left.\max(2^{\mu_{UL}-\mu_{DL}}, 1)\right) = 0,$$

and for at least one serving cell of PDSCH receptions and a PUCCH transmission (e.g., PUCCH containing HARQ-ACK information), the UE is configured with a carrier aggregation slot offset parameter (e.g., 3GPP parameter ca-SlotOffset). $N_{slot,offset}^{UL}$ is an uplink slot offset, $N_{slot,offest,c}^{DL}$ is a downlink slot offset, $\mu_{offset,UL}$ is an uplink reference SCS configuration parameter and $\mu_{offset,DL,c}$ is a downlink reference SCS configuration parameter for the serving cell c.

c) Condition COND3: the UE is configured with a subslot length parameter (for example, the UE is configured with the 3GPP parameter sub slotLengthForPUCCH).

Step S2: for each candidate uplink slot, determining candidate downlink slots corresponding to it. If a downlink slot overlaps with multiple uplink slots in the time domain, an uplink slot associated with the downlink slot is determined according to a second predefined condition. The second predefined condition may include at least one of:

a) Condition Cond4: the UE is configured with the subslot length parameter, and the uplink slot is the earliest (or latest) uplink slot in time sequence from among uplink slots overlapping with the downlink slot.

b) Condition Cond5: the UE is configured with the subslot length parameter, and the uplink slot is an uplink slot with a smallest index (or a largest index) from among uplink slots overlapping with the downlink slot.

c) Condition COND6: an index of the uplink slot is $n_U-K_{1,k}$, where a value of $K_{1,k}$ is determined by the set $K_1$.

Step S3: for each candidate downlink slot, deleting a row corresponding to an invalid SLIV from a set R of rows of a table associated with time domain resource allocation (e.g., a time domain resource allocation table). The invalid SLIV may be an SLIV that satisfies a predefined condition 3. The predefined condition 3 may be at least:

a) Condition COND7: the UE is configured with the subslot length parameter, and the end of time domain resources of a PDSCH corresponding to the SLIV is not in any of uplink slot $n_U-K_{1,k}$, where a value of $K_{1,k}$ is determined by the set $K_1$.

Step S4: for each candidate downlink slot, determining a maximum value of a number of non-overlapping valid PDSCHs.

In some embodiments, according to an absolute time of an uplink slot (subslot) and a downlink slot (for example, with a time at the base station side as reference), a downlink slot with the earliest start time overlapping with an uplink slot (subslot) is determined (for example, a number of the downlink slot with the earliest time is $n_{0,k}$), and numbers of other downlink slots overlapping with the uplink slot (subslot) are determined according to $n_{0,k}$ plus an offset.

The method adopts a uniform way to determine the downlink slot with the earliest start time overlapping with the uplink slot (subslot) for the slot-based PUCCH and subslot-based PUCCH transmission, as well as for the cases that the CA slot offset parameter is configured and the CA slot offset parameter is not configured, which can simplify the implementation of the UE and reduce the implementation complexity.

In an example, for a certain serving cell c, an active downlink BWP and an active uplink BWP, the UE determines a set of $M_{A,c}$ occasions for candidate PDSCH receptions for which the UE transmits corresponding HARQ-ACK information in a PUCCH in an uplink slot $n_U$. For the set of slot timing values $K_1$, the UE may determine the set of $M_{A,c}$ occasions according to pseudo code-1, which is set forth below, before the claims section.

It should be noted that the slot in the pseudo code may refer to a slot containing 14 symbols (or 12 symbols), or may refer to a subslot containing 2 symbols and/or 7 symbols and/or 6 symbols. If the UE is configured with the subslot length parameter, the slot may refer to the subslot, otherwise, the slot is the slot containing 14 symbols (or 12 symbols).

It should be noted that in pseudo code-1, "if the UE is configured with the subslot length parameter, and downlink slot $n_{0,k}+n_D$ overlaps with uplink slot $n_U-K_{1,k-1}$, where k>0" may be replaced by "if the UE is configured with the subslot length parameter, and downlink slot $n_{0,k}$ $n_D$ overlaps with uplink slot $n_U-K_{1,k+1}$, where $K_{1,k+1}$ belongs to the set K1 (or, where k<C($K_1$)−1)".

It should be noted that $N_{PDSCH}^{repeat, \, max}$ in the pseudo code is a maximum number of repetitions of the PDSCH.

In an example, for a certain serving cell c, an active downlink BWP and an active uplink BWP, the UE determines a set of $M_{A,c}$ occasions for candidate PDSCH receptions for which the UE transmits corresponding HARQ-ACK information in a PUCCH in an uplink slot $n_U$. For the set of slot timing values $K_1$, the UE may determine the set of $M_{A,c}$ occasions according to pseudo code-2, which is set forth below, before the claims section.

In some embodiments, a downlink DCI format may schedule one or Np PDSCHs, where Np is an integer greater than 1. The base station may configure a PDSCH TDRA table T for the UE to determine possible time resources for PDSCHs. A row in the table T may indicate time resource information for one or more PDSCHs. The time resource information for each PDSCH includes an SLIV, a parameter K0 and a PDSCH mapping type. For example, the base station configures a time dimension resource allocation list for PDSCHs (corresponding to the PDSCH TDRA table T), for example, through PDSCH-TimeDomainResourceAllocationList. The PDSCH-TimeDomainResourceAllocationList contains Ntdra entries, each entry corresponds to a row of the PDSCH TDRA table T. That is, the PDSCH TDRA table T contains Ntdra rows. An entry in the PDSCH-TimeDomainResourceAllocationList may contain SLIVs, PDSCH mapping types and parameters K0 for one or more PDSCHs. Accordingly, a row of the PDSCH TDRA table T may contain SLIVs, PDSCH mapping types and parameters K0 for one or more PDSCHs. When a number of PDSCHs contained in an entry in the PDSCH-TimeDomainResourceAllocationList is greater than 1, an SLIV, a PDSCH mapping type and a parameter K0 for each PDSCH in the entry are indicated separately. The downlink DCI format indicates time resources of Np PDSCHs scheduled by the DCI by indicating a row index of the PDSCH TDRA table T. If the time domain resource of one PDSCH of the Np PDSCHs overlaps with at least one of semi-statically configured uplink symbols (configured by higher layer signaling) (e.g., uplink symbols configured by 3GPP parameter tdd-UL-DL-ConfigurationCommon or tdd-UL-DL-ConfigurationDedicated), the UE does not receive the PDSCH. The UE may consider that the base station does not transmit the PDSCH. The mapping type in a row of the TDRA table T is specified by protocols and/or configured by higher layer signaling to be the same.

In some embodiments, when a DCI format schedules multiple PDSCHs, a time interval K1 between the last PDSCH and a PUCCH reporting HARQ-ACK thereof may be indicated in the DCI format, and K1 for a non-last PDSCH scheduled by the DCI format is determined by K1 indicated in the DCI format and a time interval between the non-last PDSCH and the last PDSCH. For example, if a DCI format schedules 2 PDSCHs, K0=0 for the first PDSCH, K0=1 for the second PDSCH, and the DCI format indicates K1=1, then K1' corresponding to the first PDSCH=K1+K0 offset, that is, K1'=2. In this case, the K0 offset is a difference between K0 for the second PDSCH and K0 for the first PDSCH.

For example, an extended set of parameters K1 and an extended set of time domain resource allocation tables may be determined according to the following method.

First, the extended set of K1 (K1') and the extended set of time domain resource allocation tables R' are determined for a row in a time domain resource allocation table R. The step may include:

a) putting each entry (e.g., SLIV) of this row in the time domain resource allocation table R into the extended set of the time domain resource allocation tables R' respectively; and b) determining a corresponding K1 value for each entry in the extended set of the time domain resource allocation tables R' respectively, and putting the determined K1 value into the extended set of K1 (K1').

Then, the extended set of K1 is determined as a union of the extended set of K1 corresponding to all rows. The extended set of the time domain resource allocation tables R is determined as a union of the extended set of the time domain resource allocation tables R corresponding to all rows.

For a row r in the time domain resource allocation table R, a value of the extended K1 corresponding to this row may be determined according to one or more of the set of K1, the set of K0 corresponding to this row, a maximum value of K0 in this row, an SCS parameter $\mu_{UL}$ of an uplink serving cell or an SCS parameter $\mu_{DL}$ of a downlink serving cell. The maximum value of K0 in a row may be equivalent to "K0 of the last SLIV".

For an SLIV in row r, $K_1'=(K_1+\lceil \Delta K_0 \cdot 2^{\mu_{UL}-\mu_{DL}} \rceil) \cup (K_1+\lfloor \Delta K_0 \cdot 2^{\mu_{UL}-\mu_{DL}} \rfloor))$, where K0 offset $\Delta K_0$ is equal to max $(K_{0,r})-K_0$. Max $(K_{0,r})$ is a maximum value of K0 value in row r, where $K_0$ is the K0 value for the SLIV. Alternatively, K0 offset $\Delta K_0$ is equal to $K_{0,last}-K_0$. $K_{0,last}$ is a K0 value corresponding to the last SLIV in row r.

FIG. 8 is a schematic diagram of a value of an extended timing parameter K1 according to an embodiment. As shown in FIG. 8, for K1=1, the extended K1 may be 2 (case2) or 3 (case1) depending on a slot where the last PDSCH is located. For case1, the upper bound of $K_1+\lceil \Delta K_0 \cdot 2^{\mu_{UL}-\mu_{DL}} \rceil$ should be taken, and for case2, the lower bound of $K_1+\lfloor \Delta K_0 \cdot 2^{\mu_{UL}-\mu_{DL}} \rfloor$ should be taken.

For example, in some embodiments, if the set R of rows includes a row with multiple entries (e.g., an SLIV), the index of the set R of rows and the set of slot timing values $K_1$ are updated according to pseudo code-3, which is set forth below, before the claims section.

When the method extends a time domain resource table for scheduling one PDSCH and a set of K1 according to a time domain resource allocation table for scheduling multiple PDSCHs, and then determines the semi-static HARQ-ACK codebook, the existing embodiments may be reused, thereby reducing the implementation complexity. The method can improve the scheduling flexibility, and the HARQ-ACK codebook can contain HARQ-ACK information for all PDSCHs that may be scheduled.

It should be noted that in pseudo code-3, "$K_{1T}=K_{1T} \cup ((K_1+\lceil \Delta K_{0,r,d} \cdot 2^{\mu_{UL}-\mu_{DL}} \rceil) \cup (K_1+\lfloor \Delta K_{0,r,d} \cdot 2^{\mu_{UL}-\mu_{DL}} \rfloor))$" may be replaced by "$K_{1T}=K_{1T} \cup (K_1+\lceil \Delta K_{0,r,d} \cdot 2^{\mu_{UL}-\mu_{DL}} \rceil)$" or "$K_{1T}=K_{1T} \cup (K_1+\lfloor \Delta K_{0,r,d} \cdot 2^{\mu_{UL}-\mu_{DL}} \rfloor)$", which can reduce the size of the semi-static HARQ-ACK codebook.

It should be noted that $\Delta K_{0,r,d}$ in pseudo code-3 represents an element with an index of d in $\Delta K_{0,r}$, and $\Delta K_{0,r,d}$ may also be represented with $\Delta K_{0,r}(d)$. For example, "$K_{1T}=K_{1T} \cup ((K_1+\lceil \Delta K_{0,r,d} \cdot 2^{\mu_{UL}-\mu_{DL}} \rceil) \cup (K_1+\lfloor \Delta K_{0,r,d} \cdot 2^{\mu_{UL}-\mu_{DL}} \rfloor))$" in pseudo code-3 may be replaced by "$K_{1,T}=K_{1,T} \cup (K_1+\lceil \Delta K_{0,r}(d) \cdot 2^{\mu_{UL}-\mu_{DL}} \rceil) \cup (K_1+\lfloor \Delta K_{0,r}(d) \cdot 2^{\mu_{UL}-\mu_{DL}} \rfloor))$".

Due to the extension of the set of K1, HARQ-ACK information corresponding to some candidate PDSCHs of downlink slots in the semi-static HARQ-ACK codebook to be transmitted in uplink slot $n_U$ cannot be transmitted in uplink slot $n_U$. To solve this problem, the following methods may be adopted. For example, for each candidate PDSCH in each downlink slot, it is determined whether it can be transmitted in uplink slot $n_U$, and if it cannot be transmitted in uplink slot $n_U$, an SLIV corresponding to this candidate PDSCH is deleted from the time domain resource allocation table.

In some embodiments, for a certain serving cell c, an active downlink BWP and an active uplink BWP, the UE determines a set of $M_{A,c}$ occasions for candidate PDSCH receptions for which the UE transmits corresponding HARQ-ACK information in a PUCCH in an uplink slot $n_U$. For the set of slot timing values $K_1$, the UE may determine the set of $M_{A,c}$ occasions according to pseudo code-4 or pseudo code-5, which are set forth below, before the claims section.

The method is simple to implement, and can reuse the existing embodiments, reduce the size of the semi-static HARQ-ACK codebook, improve the reliability of uplink transmission, reduce PUCCH resources, improve the system spectrum efficiency and reduce the UE transmission power.

It should be noted that in the pseudo code of generating the semi-static HARQ-ACK codebook if the HARQ-ACK codebook is configured with the subslot length parameter, "the HARQ-ACK codebook is configured with the subslot length parameter, and the end of the PDSCH time domain resource corresponding to row r is not within any of uplink slot $n_U-K_{1,l}$, where $0 \leq l < C(K_1)$" may be replaced by "HARQ-ACK information for the PDSCH corresponding to row r (e.g., PDSCH in slot $n_D$) cannot be reported (or transmitted) in slot $n_U$".

For example, the HARQ-ACK codebook may be generated according to pseudo code-6, which is set forth below, before the claims section.

As another example, the HARQ-ACK codebook may be generated according to pseudo code-6a, which is set forth below, before the claims section.

The method can generate the subslot-based semi-static HARQ-ACK codebook and the semi-static HARQ-ACK codebook of multiple PDSCHs scheduled by a DCI format, which can reduce the UE implementation complexity.

In some embodiments, the UE may be configured with repetitions of a PDSCH in a downlink slot. Time domain resources of the last repetition may be determined according to the TDRA table configured by higher layer signaling and an interval K of repetitions in a slot (for example, K may be configured by higher layer signaling, e.g., by parameter startingSymbolOffsetK in parameter RepetitionSchemeConfig). Positions of HARQ-ACK bits of the PDSCH in the semi-static HARQ-ACK codebook may be determined by the SLIV for the first repetition or the SLIV for the last repetition within a downlink slot.

In some embodiments, at present, the repetitions of a PDSCH in a slot are not considered when determining whether an SLIV is a valid SLIV in the pseudo code of generating a semi-static HARQ-ACK codebook. For example, if no symbol in the SLIV overlaps with uplink symbols configured by higher layer signaling, it is the valid SLIV, otherwise, it is an invalid SLIV, and the invalid SLIV is deleted from the time domain resource allocation table. It may be caused that a scheduled PDSCH has no corresponding HARQ-ACK bit in the semi-static codebook. The following Method 1 and/or Method 2 may be adopted to solve the above problem.

Method 1: if 2 repetitions (or all repetitions) of a PDSCH corresponding to an SLIV overlap with uplink symbols configured by higher layer signaling, the SLIV is an invalid SLIV, and the SLIV is deleted from the time domain resource allocation table. Otherwise, the SLIV is a valid SLIV. For example, a determination condition is newly added into the determination condition for determining a valid SLIV in pseudo code-1, pseudo code-2, pseudo code-4 or pseudo code-5 of embodiments of the disclosure. If the determination condition is satisfied, the SLIV is deleted (e.g., R=R\r). For example, the newly added determination condition may be that at least one symbol in the time domain resources of two repetitions of the PDSCH corresponding to row r is configured as uplink. The method can improve the reliability of the HARQ-ACK codebook, improve the scheduling flexibility, and avoid the situation that the respective PDSCH scheduling cannot be performed because there is no HARQ-ACK feedback bit.

Method 2: it may be specified by protocols that the UE does not predict, i.e., expect, that any PDSCH repetition of PDSCH repetitions in a downlink slot overlaps with uplink symbols configured by higher layer signaling. Or, the UE does not expect that the first PDSCH repetition of PDSCH repetitions in a downlink slot overlaps with the uplink symbols configured by the higher layer signaling. Or, the UE does not expect that the second (last) PDSCH repetition of PDSCH repetitions in a downlink slot overlaps with the uplink symbols configured by the higher layer signaling. The method can reduce the UE implementation complexity.

Figure 9:
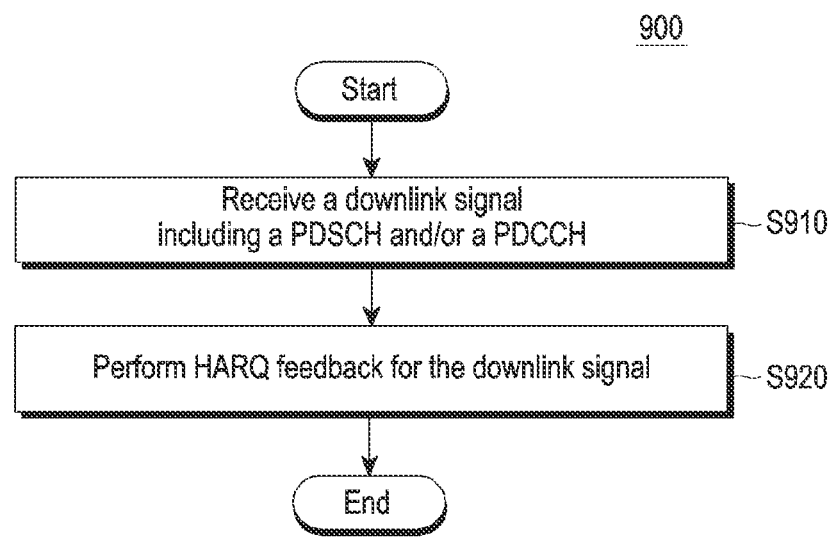
FIG. 9 is a flowchart of a method performed by a terminal according to an embodiment.

FIG. 9 is a flowchart of a method performed by a terminal according to an embodiment.

Referring to FIG. 9, in operation S910, receiving a downlink signal, where the downlink signal includes at least one of a PDSCH or a PDCCH.

Next, in operation S920, HARQ-ACK feedback for the downlink signal is performed.

In some embodiments, performing the HARQ-ACK feedback for the downlink signal may include: determining one or more candidate uplink slots; determining corresponding candidate downlink slots for each of the one or more candidate uplink slots; for each of the candidate downlink slots, deleting a row corresponding to a specific SLIV from a set of rows of a time domain resource allocation table, each of the rows of the time domain resource allocation table corresponding to a respective SLIV; determining a set of non-overlapping valid PDSCHs for each of the candidate downlink slots, where a number of PDSCHs in the set of valid PDSCHs is a maximum value of a number of the non-overlapping valid PDSCHs; and determining a size and an order of the HARQ-ACK codebook based on the set of the non-overlapping valid PDSCHs.

In some embodiments, determining the one or more candidate uplink slots may include determining the one or more candidate uplink slots based on whether the terminal is configured with a parameter related to a subslot length.

In some embodiments, determining the one or more candidate uplink slots based on whether the terminal is configured with the parameter related to the subslot length may include: determining all uplink slots as the one or more candidate uplink slots, in case that the terminal is configured with the parameter related to the subslot length; and/or determining the one or more candidate uplink slots based on whether a parameter related to a carrier aggregation slot offset is configured, in case that the terminal is not configured with the parameter related to the subslot length.

In some embodiments, determining the respective candidate downlink slot for each of the one or more candidate uplink slots may include: when a candidate downlink slot overlaps with a plurality of candidate uplink slots, determining a candidate uplink slot corresponding to the candidate downlink slot as: the earliest or latest uplink slot in time sequence among the uplink slots overlapping with the determined candidate downlink slot, in case that the terminal is configured with the parameter related to the subslot length; and/or an uplink slot with a smallest index or a largest index among the uplink slots overlapping with the determined candidate downlink slot, in case that the terminal is configured with the parameter related to the subslot length; and/or a candidate uplink slot with an index of $n_U - K_{1,k}$, where $n_U$ is an index of an uplink slot in which HARQ-ACK information is transmitted, $K_{1,k}$ is an entry from a set of first timing parameters, and k is an index of the entry from the set of the first timing parameters, where the first timing parameters indicate a time interval between an uplink channel for transmitting HARQ-ACK information for a PDSCH and the PDSCH.

In some embodiments, the specific SLIV may include an invalid SLIV. The SLIV is determined as the invalid SLIV if the terminal is configured with the parameter related to the subslot length and the end of time domain resources of a PDSCH corresponding to the SLIV is not within any of uplink slots with an index of $n_U - K_{1,k}$, where $n_U$ is an index of an uplink slot in which HARQ-ACK information is transmitted, $K_{1,k}$ is an entry from a set of first timing parameters, and k is an index of the entry from the set of the first timing parameters, where the first timing parameters indicate a time interval between an uplink channel for transmitting HARQ-ACK information for a PDSCH and the PDSCH.

In some embodiments, performing the HARQ-ACK feedback for the downlink signal may include: extending a set of first timing parameters and/or extending a set of time domain resource allocation tables, where the first timing parameters indicate a time unit interval between an uplink channel for transmitting HARQ-ACK information for a PDSCH and the PDSCH; and performing the HARQ-ACK feedback based on the extended set of the first timing parameters and/or the extended set of the time domain resource allocation tables.

In some embodiments, extending the set of the first timing parameters and/or the extending of the set of the time domain resource allocation tables may include, for each row of the set of the time domain resource allocation tables: putting each entry of the row in the time domain resource allocation table into the extended set of the time domain resource allocation tables respectively, and determining a corresponding first timing parameter for each entry in the extended set of the time domain resource allocation tables respectively, and putting the determined first timing parameter in the extended set of the first timing parameters; and determining the extended set of the first timing parameters according to an extended set of first timing parameters corresponding to all of the rows, and determining the extended set of the time domain resource allocation tables according to a set of time domain resource allocation tables corresponding to all of the rows.

In some embodiments, for an SLIV of each row of the time domain resource allocation table, an extended set of first parameters may be determined based on one or more of: the set of the first timing parameters, a set of second timing parameters corresponding to the row, a maximum value of the second timing parameters for the row, an uplink SCS configuration, or a downlink SCS configuration. The second timing parameters indicate a time unit interval between a PDSCH scheduled by a DCI and a PDCCH carrying the DCI.

In some embodiments, for each SLIV of each row of the time domain resource allocation table, the extended set of the first parameters is determined based on Equation (1):

$$K1'=(K_1+\lceil \Delta K_0 \cdot 2^{\mu_{UL}-\mu_{DL}} \rceil) \cup (K_1+\lfloor \Delta K_0 \cdot 2^{\mu_{UL}-\mu_{DL}} \rfloor)) \quad (1)$$

, where $K_1$ is the set of the first timing parameters, K1' is the extended set of the first parameters, $\Delta K_0$ is a difference between a maximum value of second timing parameters for the row and a second timing parameter for this SLIV, $\mu_{UL}$ is an uplink SCS configuration parameter, and $\mu_{DL}$ is a downlink SCS configuration parameter.

In some embodiments, the method may further include: determining, for each candidate PDSCH of one or more candidate PDSCHs in each downlink slot of one or more downlink slots corresponding to an uplink slot with an index of $n_U-K_{1,k}$, whether the candidate PDSCH can be transmitted in an uplink slot with an index of $n_U$, where $n_U$ is an index of an uplink slot in which HARQ-ACK information is transmitted, $K_{1,k}$ is an entry from a set of first timing parameters, and k is an index of the entry from the set of the first timing parameters; and deleting an SLIV corresponding to the candidate PDSCH from the time domain resource allocation table, in case that the candidate PDSCH cannot be transmitted in the uplink slot with the index of $n_U$.

In some embodiments, performing the HARQ-ACK feedback for the downlink signal may include: for each row of the time domain resource allocation table that corresponds to a respective SLIV, determining whether the respective SLIV that corresponds to each row of the time domain resource allocation table is valid; deleting the respective SLIV to update the time domain resource allocation table, in case that the SLIV is invalid; and performing the HARQ-ACK feedback based on the updated time domain resource allocation table.

In some embodiments, the respective SLIV is determined to be invalid based on at least one of that: the terminal is configured with a parameter related to a subslot length, and the end of time domain resources of a PDSCH corresponding to the SLIV is not within any of uplink slots with an index of $n_U-K_{1,k}$, where $n_U$ is an index of an uplink slot in which HARQ-ACK information is transmitted, $K_{1,k}$ is an entry from a set of first timing parameters, and k is an index of the entry from the set of the first timing parameters; or at least two repetitions of a PDSCH that corresponds to a row corresponding to the SLIV in the table within a downlink slot or all repetitions of the PDSCH overlap with uplink symbols configured by higher layer signaling.

In some embodiments, the terminal does not expect that any repetition of repetitions in a downlink slot overlaps with uplink symbols configured by higher layer signaling; and/or the terminal does not expect that the first repetition of repetitions in a downlink slot overlaps with the uplink symbols configured by the higher layer signaling; and/or the terminal does not expect that the second repetition of repetitions in a downlink slot overlaps with the uplink symbols configured by the higher layer signaling; and/or the terminal does not expect that the last repetition of repetitions in a downlink slot overlaps with the uplink symbols configured by the higher layer signaling.

In some embodiments, the UE may be scheduled with more than one PDSCH by a DCI format, and the UE may be configured with HARQ-ACK time domain bundling. For a semi-static HARQ-ACK codebook, according to the last PDSCH of multiple PDSCHs scheduled by a DCI format, the UE may determine a position of HARQ-ACK for the PDSCHs in the HARQ-ACK codebook, and it may be specified by protocols that the UE does not expect that the last PDSCH of the multiple PDSCHs scheduled by the DCI overlaps with the uplink symbols configured by higher layer signaling (e.g., uplink symbols configured by tdd-UL-DL-ConfigurationCommon or tdd-UL-DL-ConfigurationDedicated) in time domain. In this way, it can prevent PDSCHs scheduled by multiple DCI formats from feeding back HARQ-ACK information thereof in a same HARQ-ACK bit, which can avoid extending of K1 and TDRA tables, reduce the UE implementation complexity and improve the reliability of HARQ-ACK transmission.

In some embodiments, the UE is configured with the semi-static HARQ-ACK codebook, and the UE is configured to receive multiple PDSCHs scheduled by a DCI in a serving cell (e.g., a row in the TDRA table that contains multiple SLIVs), where a set of PDSCH TDRA tables is R. If the UE is configured with PDSCH bundling (for example, the UE is configured with PDSCH bundling in time domain; for example, it may be configured by 3GPP parameter enableTimeDomainHARQ-Bundling), the UE may convert the TDRA table into a TDRA table in which a row contains only one SLIV (a number of SLIVs in a row is 1), and an SLIV of each row in the converted TDRA table corresponds to the last SLIV of the row in the original TDRA table.

For example, set R'=R, set R to a set of rows in set R' (or set R), and each of the rows contains the last SLIV in the corresponding row in set R'.

The UE may determine whether an SLIV is a valid SLIV according to the corresponding row r in set R'.

In an example, for a certain serving cell c, an active downlink BWP and an active uplink BWP, the UE determines a set of $M_{A,c}$ occasions for candidate PDSCH receptions for which the UE transmits corresponding HARQ-ACK information in a PUCCH in an uplink slot $n_U$. For the set of slot timing values $K_1$, the UE may determine the set of $M_{A,c}$ occasions according to pseudo code-7, which is set forth below, before the claims section.

The method can reduce the number of bits of the HARQ-ACK codebook, improve the reliability of HARQ-ACK transmission, and improve the network performance.

In some embodiments, the UE is configured with the semi-static HARQ-ACK codebook, and the UE is configured to receive multiple PDSCHs scheduled by a DCI in a serving cell (e.g., a row in the TDRA table that contains multiple SLIVs). If the UE is configured with PDSCH bundling (e.g., the UE is configured with PDSCH bundling in time domain; e.g., it may be configured by 3GPP parameter enableTimeDomainHARQ-Bundling), the UE generates HARQ-ACK information only for a PDSCH candidate position corresponding to the last SLIV of multiple SLIVs in a row in the TDRA table, and generates NACK for a PDSCH candidate position corresponding to a non-last SLIV. In Reed Muller (RM) coding, the transmission power is determined according to a number of bits unknown to the base station, so the known NACK bits will not increase the transmission power, which can reduce the transmission power of the UE and the interference to other users.

For example, the UE may determine the HARQ-ACK codebook according to pseudo code-8, which is set forth below, before the claims section.

It should be noted that the binary AND operation is that, if all binary numbers are 1, the result is 1, otherwise, the result is 0, that is, if at least one binary number is 0, the result is 0.

The method defines the behavior of the UE, which can improve the reliability of HARQ-ACK codebook and reduce PDSCH retransmission, thus improving the network performance.

In an example, the UE may determine the HARQ-ACK codebook according to pseudo code-9, which is set forth below, before the claims section.

The method defines the behavior of the UE, which can improve the reliability of HARQ-ACK codebook and reduce PDSCH retransmission, thus improving the network performance.

In an example, the UE may determine the HARQ-ACK codebook according to pseudo code-10, which is set forth below, before the claims section.

The method defines the behavior of the UE, which can improve the reliability of HARQ-ACK codebook and reduce PDSCH retransmission, thus improving the network performance.

In an example, the UE may determine the HARQ-ACK codebook according to pseudo code-11, which is set forth below, before the claims section.

The method defines the behavior of the UE, which can improve the reliability of HARQ-ACK codebook and reduce PDSCH retransmission, thus improving the network performance.

It should be noted that if the UE is not configured with the carrier aggregation slot offset parameter (e.g., 3GPP parameter ca-SlotOffset), in embodiments of the disclosure, "HARQ-ACK information for the PDSCH corresponding to row r (e.g., PDSCH in slot $n_D$) cannot be reported (or transmitted) in slot $n_U$" may be replaced by "HARQ-ACK information for the PDSCH corresponding to row r in slot $\lfloor (n_U - K_{1,k}) \cdot 2^{\mu_{UL} - \mu_{DL}} \rfloor + n_D$ cannot be reported (or transmitted) in slot $n_U$". If the UE is configured with the carrier aggregation slot offset parameter (e.g., 3GPP parameter ca-SlotOffset), in embodiments of the disclosure, "HARQ-ACK information for the PDSCH corresponding to row r (e.g., PDSCH in slot $n_D$) cannot be reported (or transmitted) in slot $n_U$" may be replaced by "HARQ-ACK information for the PDSCH corresponding to row r in slot $$\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$$

cannot be reported (or transmitted) in slot $n_U$".

In an example, the UE may determine the set of $M_{A,c}$ occasions according to pseudo code-12, which is set forth below, before the claims section.

This method defines the behavior of the UE and can improve the reliability of uplink transmission.

Figure 10:
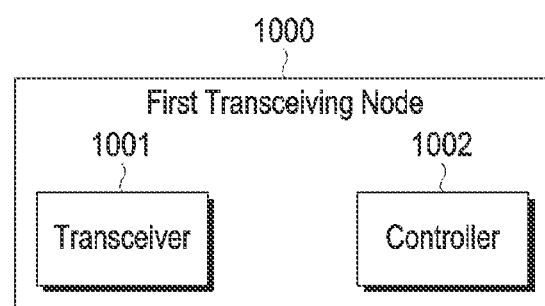
FIG. 10 is a block diagram of a first transceiving node according to an embodiment.

FIG. 10 is a block diagram of a first transceiving node 1000 according to an embodiment.

Referring to FIG. 10, the first transceiving node 1000 may include a transceiver 1001 and a controller 1002.

The transceiver 1001 may be configured to transmit first data and/or first control signaling to a second transceiving node and receive second data and/or second control signaling from the second transceiving node in a time unit.

The controller 1002 may be an application specific integrated circuit (ASIC) or at least one processor. The controller 1002 may be configured to control the overall operation of the first transceiving node, including controlling the transceiver 1001 to transmit the first data and/or the first control signaling to the second transceiving node, and receive the second data and/or the second control signaling from the second transceiving node in a time unit.

In some embodiments, the controller 1002 may be configured to perform one or more of operations in the methods of various embodiments described above.

In the following description, a base station is taken as a non-limiting example to illustrate the first transceiving node, a UE is taken as a non-limiting example to illustrate the second transceiving node. Downlink data and/or downlink control signaling, as a non-limiting example, are used to illustrate the first data and/or the first control signaling. A HARQ-ACK codebook may be included in the second control signaling, and uplink control signaling, as a non-limiting example, is used to illustrate the second control signaling.

Figure 11:
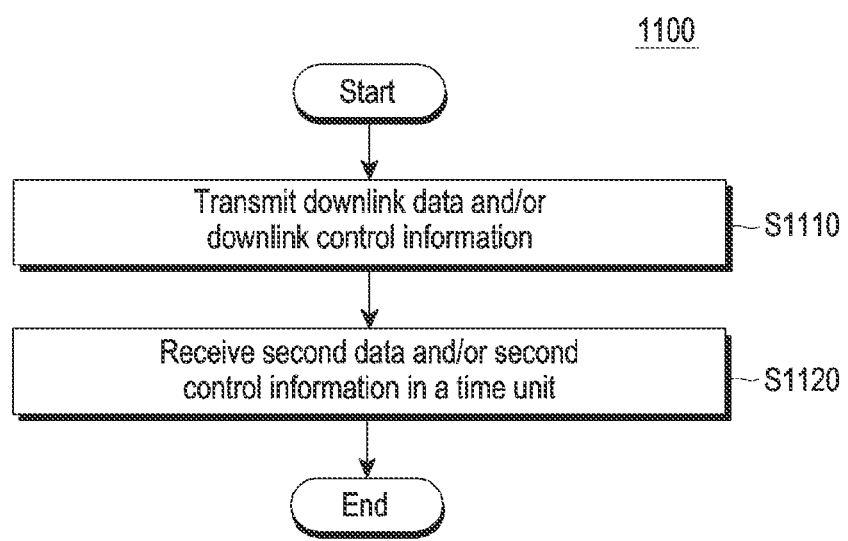
FIG. 11 is a flowchart of a method performed by a base station according to an embodiment.

FIG. 11 is a flowchart of a method 1100 performed by a base station according to an embodiment.

Referring to FIG. 11, in step S1110, the base station transmits downlink data and/or downlink control information.

In step S1120, the base station receives second data and/or second control information from a terminal in a time unit.

For example, the method 1100 may include one or more of the operations performed by the base station described in various embodiments of the disclosure.

In some embodiments, the downlink channel may include a PDCCH and/or a PDSCH. The uplink channel may include a PUCCH and/or a PUSCH.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an ASIC, a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

Pseudo code-1

Set j = 0 -index of occasion for candidate PDSCH reception or SPS PDSCH release
Set B = ø
Set $M_{A,c}$ = ø
Set $\mathcal{C}(K_1)$ to the cardinality of set $K_1$
Set k = 0 -index of slot timing values $K_{1,k}$ in descending order of the slot timing values, in set $K_1$ for serving cell c
If the UE is not configured with the carrier aggregation slot offset parameter (e.g., 3GPP parameter ca-SlotOffset) for any serving cell of PDSCH receptions and the PUCCH transmis-sion (e.g., the PUCCH containing HARQ-ACK information)
  while k < $\mathcal{C}(K_1)$
  if mod ($n_U - K_{1,k}$ +1, max($2^{\mu UL - \mu DL}$,1)) = 0 or the UE is configured with the subslot length parameter (for example, the UE is configured with the 3GPP parameter subslotLengthForPUCCH)
    Set $n_D$ = 0 -index of a downlink slot overlapping with an uplink slot (index of a downlink slot within the uplink slot), e.g., uplink slot $n_U - K_{1,k}$
    while $n_D < N_k$, where $N_k$ is a number of downlink slots overlapping with uplink slot $n_U - K_{1,k}$ if the UE is configured with the subslot length parameter, otherwise (if the UE is not configured with the subslot length parameter), $N_k$ = max ($2^{\mu DL - \mu UL}$, 1)
      Set R to the set of rows, e.g., the set of rows configured by a TDRA table
      Set $\mathcal{C}(R)$ to the cardinality of set R
      Set r = 0 -index of row in set R
      if slot $n_U$ starts at a same time as or after a slot (or time) for an active downlink BWP change on serving cell c or an active uplink BWP change on the Pcell and slot $n_{0,k}$ + $n_D$ is before the slot (or time) for the active downlink BWP change on serving cell c or the active uplink BWP change on the Pcell, where slot $n_{0,k}$ is a downlink slot with a smallest index among downlink slots overlapping with uplink slot $n_U - K_{1,k}$ (or, within uplink slot $n_U - K_{1,k}$), or if the UE is configured with the subslot length parameter, and downlink slot $n_{0,k}$ + $n_D$ overlaps with uplink slot $n_U - K_{1,k-1}$, where k > 0
        $n_D = n_D + 1$;
      else
        while r < $\mathcal{C}(R)$
          if the UE is configured with tdd-UL-DL-ConfigurationCommon, or tdd-UL-DL-ConfigurationDedicated and, for each slot from slot $n_{0,k}$ + $n_D$ - $N_{PDSCH}^{repeat,max}$ + 1 to slot $n_{0,k}$ + $n_D$, at least one symbol of the PDSCH time domain resource corresponding to row r is configured as uplink, where $K_{1,k}$ is the k-th slot timing value in set $K_1$, where slot $n_{0,k}$ is a downlink slot with a smallest index among downlink slots overlapping with uplink slot $n_U - K_{1,k}$ (or, within uplink slot $n_U - K_{1,k}$), or if the UE is configured with the subslot length parameter, and the end of the PDSCH time domain resource corresponding to row r is not within any of uplink slot $n_U - K_{1,l}$, where 0 ≤ l < C($K_1$)
            R = R\r;

| Pseudo code-1 |
|---|

```
      else
          r = r + 1;
      end if
  end while
  if the UE does not indicate a capability to receive more than one unicast PDSCH
      per slot and R ≠ ∅,
      M_{A,c} = M_{A,c} ∪ j;
      j = j + 1;
  else
      Set 𝒞(R) to the cardinality of set R
      Set m to the smallest last OFDM symbol index, as determined by the SLIV,
          among all rows of R
      while R ≠ ∅
          Set r = 0
          while r < 𝒞(r)
              if S ≤ m for start symbol index S for row r
                  b_{r,k,n_D} = j; -index of occasion for candidate PDSCH reception or SPS
                      PDSCH release for row r
                  R = R\r;
                  B = B ∪ b_{r,k,n_D};
              else
                  r = r + 1;
              end if
          end while
          M_{A,c} = M_{A,c} ∪ j;
          j = j + 1;
          Set m to the smallest last OFDM symbol index among all rows of R;
      end while
  end if
  n_D = n_D + 1;
      end if
    end while
  end if
  k = k + 1;
end while
else
while k < 𝒞(K_1)
``` if $\mod\left(n_U - K_{1,k} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$ or the UE is configured with the subslot length parameter (for example, the UE is configured with the 3 GPP parameter subslotLengthForPUCCH)
Set $n_D = 0$ -index of a downlink slot overlapping with an uplink slot (index of a downlink slot within the uplink slot), e.g., uplink slot $n_U - K_{1,k}$
while $n_D < N_k$, where $N_k$ is a number of downlink slots overlapping with uplink slot $n_U - K_{1,k}$ if the UE is configured with the subslot length parameter, otherwise (if the UE is not configured with the subslot length parameter), $N_k = \max(2^{\mu_{DL}-\mu_{UL}}, 1)$
   Set R to the set of rows, e.g., the set of rows configured by a TDRA table
   Set $𝒞(r)$ to the cardinality of set R
   Set r = 0 -index of row in set R
   if slot $n_U$ starts at a same time as or after a slot (or time) for an active downlink
      BWP change on serving cell c or an active uplink BWP change on the Pcell and
      slot $n_{0,k} + n_D$ is before the slot (or time) for the active downlink BWP change on
      serving cell c or the active uplink BWP change on the Pcell, where slot $n_{0,k}$ is a
      downlink slot with a smallest index among downlink slots overlapping with
      uplink slot $n_U - K_{1,k}$ (or, within uplink slot $n_U - K_{1,k}$), or if the UE is configured
      with the subslot length parameter, and downlink slot $n_{0,k} + n_D$ overlaps with
      uplink slot $n_U - K_{1,k-1}$, where k > 0
      $n_D = n_D + 1$;
   else
      while r < 𝒞(R)
         if the UE is configured with tdd-UL-DL-ConfigurationCommon, or
            tdd-UL-DL-ConfigurationDedicated and, for each slot from slot $n_{0,k} + n_D - N_{PDSCH}^{repeat,max} + 1$ to slot $n_{0,k} + n_D$, at least one symbol of the PDSCH
            time domain resource corresponding to row r is configured as uplink, where
            $K_{1,k}$ is the k-th slot timing value in set $K_1$, where slot $n_{0,k}$ is a downlink slot
            with a smallest index among downlink slots overlapping with uplink slot
            $n_U - K_{1,k}$ (or, within uplink slot $n_U - K_{1,k}$), or if the UE is configured with the
            subslot length parameter, and the end of the PDSCH time domain resource
            corresponding to row r is not within any of uplink slot $n_U - K_{1,l}$, where $0 \leq l < C(K_1)$
            R = R\r;

| Pseudo code-1 |
|---|
|           else<br>            r = r + 1;<br>          end if<br>        end while<br>        if the UE does not indicate a capability to receive more than one unicast PDSCH<br>          per slot and R ≠ ø,<br>          $M_{A,c} = M_{A,c} \cup j$;<br>          j = j + 1;<br>        else<br>          Set $\mathcal{C}(r)$ to the cardinality of set R<br>          Set m to the smallest last OFDM symbol index, as determined by the SLIV,<br>            among all rows of R<br>          while R ≠ ø<br>            Set r = 0<br>            while r < $\mathcal{C}(r)$<br>              if S ≤ m for start symbol index S for row r<br>                $b_{r,k,n_D} = j$; -index of occasion for candidate PDSCH reception or SPS<br>                  PDSCH release for row r<br>                R = R\r;<br>                $B = B \cup b_{r,k,n_D}$;<br>              else<br>                r = r + 1;<br>              end if<br>            end while<br>            $M_{A,c} = M_{A,c} \cup j$;<br>            j = j + 1;<br>            Set m to the smallest last OFDM symbol index among all rows of R;<br>          end while<br>        end if<br>        $n_D = n_D + 1$;<br>      end if<br>    end while<br>  end if<br>  k = k + 1;<br>end while<br>end if |

| Pseudo code-2 |
|---|
| Set j = 0 -index of occasion for candidate PDSCH reception or SPS PDSCH release<br>Set B = ø<br>Set $M_{A,c}$ = ø<br>Set $\mathcal{C}(K_1)$ to the cardinality of set $K_1$<br>Set k = 0 -index of slot timing values $K_{1,k}$, in descending order of the slot timing values, in set $K_1$ for serving cell c<br>If the UE is not configured with the carrier aggregation slot offset parameter (e.g., 3GPP parameter ca-SlotOffset) for any serving cell of PDSCH receptions and the PUCCH transmission (e.g., the PUCCH containing HARQ-ACK information)<br>while k < $\mathcal{C}(K_1)$<br>  if mod $(n_U - K_{1,k} +1, \max(2^{\mu UL-\mu DL},1)) = 0$ or the HARQ-ACK codebook is configured<br>    with the subslot length parameter (for example, the UE is configured with the 3GPP<br>    parameter subslotLengthForPUCCH)<br>    Set $n_D = 0$ -index of a downlink slot overlapping with an uplink slot (index of a downlink slot within the uplink slot), e.g., uplink slot $n_U - K_{1,k}$<br>    Set $N_k$ to a number of downlink slots overlapping with uplink slot $n_U - K_{1,k}$ if the<br>      HARQ-ACK codebook is configured with the subslot length parameter, otherwise (if<br>      the HARQ-ACK codebook is not configured with the subslot length parameter),<br>      $N_k = \max(2^{\mu DL-\mu UL},1)$<br>    while $n_D < N_k$<br>      Set R to the set of rows, e.g., the set of rows configured by a TDRA table<br>      Set $\mathcal{C}(r)$ to the cardinality of set R<br>      Set r = 0 -index of row in set R<br>      if slot $n_U$ starts at a same time as or after a slot (or time) for an active downlink<br>        BWP change on serving cell c or an active uplink BWP change on the PCell and<br>        slot $n_{0,k} + n_D$ is before the slot (or time) for the active downlink BWP change on<br>        serving cell c or the active uplink BWP change on the Pcell, where slot $n_{0,k}$ is a<br>        downlink slot with a smallest index among downlink slots overlapping with<br>        uplink slot $n_U - K_{1,k}$ (or, within uplink slot $n_U - K_{1,k}$),<br>      or the HARQ-ACK codebook is configured with the subslot length parameter, and<br>        downlink slot $n_{0,k} + n_D$ overlaps with uplink slot $n_U - K_{1,k-1}$, and k > 0<br>      $n_D = n_D + 1$; |

-continued

Pseudo code-2

```
    else
      while r < 𝒞(R)
        if the UE is configured with tdd-UL-DL-ConfigurationCommon, or
          tdd-UL-DL-ConfigurationDedicated and, for each slot from slot n_{0,k} + n_D −
          N_{PDSCH}^{repeat,max} + 1 to slot n_{0,k} + n_D, at least one symbol of the PDSCH time
          domain resource corresponding to row r is configured as uplink, where K_{1,k} is
          the k-th slot timing value in set K_1, where slot n_{0,k} is a downlink slot with a
          smallest index among downlink slots overlapping with uplink slot n_U − K_{1,k}
          (or, within uplink slot n_U − K_{1,k}),
        or the HARQ-ACK codebook is configured with the subslot length parameter, and
          the end of the PDSCH time domain resource corresponding to row r is not
          within any of uplink slot n_U − K_{1,l}, where 0 ≤ l < C(K_1)
          R = R\r;
        else
          r = r + 1;
        end if
      end while
      if the UE does not indicate a capability to receive more than one unicast PDSCH
        per slot and R ≠ ∅,
        M_{A,c} = M_{A,c} ∪ j;
        j = j + 1;
      else
        Set 𝒞(R) to the cardinality of set R
        Set m to the smallest last OFDM symbol index, as determined by the SLIV,
          among all rows of R
        while R ≠ ∅
          Set r = 0
          while r < 𝒞(R)
            if S ≤ m for start symbol index S for row r
              b_{r,k,n_D} = j; -index of occasion for candidate PDSCH reception or SPS
                PDSCH release for row r
              R=R\;
              B = B ∪ b_{r,k,n_D};
            else
              r = r + 1;
            end if
          end while
          M_{A,c} = M_{A,c} ∪ j;
          j = j + 1;
          Set m to the smallest last OFDM symbol index among all rows of R;
        end while
      end if
      n_D = n_D +1;
    end if
  end while
end if
k = k + 1;
end while
else
while k < 𝒞(K_1)
```

$$\text{if } \mod\left(n_U - K_{1,k} + \left\lfloor\left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}}\right\rfloor + 1, \max(2^{\mu_{UL}-\mu_{DL}}, 1)\right) = 0$$

```
or the HARQ-ACK codebook is configured with the subslot length parameter (for
example, the UE is configured with the 3GPP parameter subslotLengthForPUCCH)
Set n_D = 0 -index of a downlink slot overlapping with an uplink slot (index of a down-
  link slot within the uplink slot), e.g., uplink slot n_U − K_{1,k}
Set N_k to a number of downlink slots overlapping with uplink slot n_U − K_{1,k} if the
  HARQ-ACK codebook is configured with the subslot length parameter, otherwise (if
  the HARQ-ACK codebook is not configured with the subslot length parameter), N_k =
  max (2^{μ_DL−μ_UL},1)
while n_D < N_k
  Set R to the set of rows, e.g., the set of rows configured by a TDRA table
  Set 𝒞(r) to the cardinality of set R
  Set r = 0 -index of row in set R
  if slot n_U starts at a same time as or after a slot (or time) for an active downlink BWP
    change on serving cell c or an active uplink BWP change on the Pcell and slot
    n_{0,k} + n_D is before the slot (or time) for the active downlink BWP change on
    serving cell c or the active uplink BWP change on the Pcell, where slot n_{0,k} is a
    downlink slot with a smallest index among downlink slots overlapping with uplink
    slot n_U − K_{1,k} (or, within uplink slot n_U − K_{1,k}),
  or the HARQ-ACK codebook is configured with the subslot length parameter, and
    downlink slot n_{0,k} + n_D overlaps with uplink slot n_U − K_{1,k−1}, and k > 0
    n_D = n_D + 1;
```

Pseudo code-2 (continued)

```
    else
        while r < 𝒞(r)
            if the UE is configured with tdd-UL-DL-ConfigurationCommon, or
                tdd-UL-DL-ConfigurationDedicated and, for each slot from slot n₀,ₖ + n_D −
                N_PDSCH^{repeat,max} + 1 to slot n₀,ₖ + n_D, at least one symbol of the PDSCH time
                domain resource corresponding to row r is configured as uplink, where K₁,ₖ is
                the k-th slot timing value in set K₁, where slot n₀,ₖ is a downlink slot with a
                smallest index among downlink slots overlapping with uplink slot n_U − K₁,ₖ
                (or, within uplink slot n_U − K₁,ₖ),
            or the HARQ-ACK codebook is configured with the subslot length parameter, and
                the end of the PDSCH time domain resource corresponding to row r is not
                within any of uplink slot n_U − K₁,ₗ where 0 ≤ l < C(K₁)
                R = R\r;
            else
                r = r + 1;
            end if
        end while
        if the UE does not indicate a capability to receive more than one unicast PDSCH
            per slot and R ≠ ø,
            M_{A,c} = M_{A,c} ∪ j;
            j = j + 1;
        else
            Set 𝒞(r) to the cardinality of set R
            Set m to the smallest last OFDM symbol index, as determined by the SLIV,
                among all rows of R
            while R ≠ ø
                Set r = 0
                while r < 𝒞(r)
                    if S ≤ m for start symbol index S for row r
                        b_{r,k,n_D} = j; -index of occasion for candidate PDSCH reception or SPS
                            PDSCH release for row r
                        R = R\r;
                        B = B ∪ b_{r,k,n_D};
                    else
                        r = r + 1;
                    end if
                end while
                M_{A,c} = M_{A,c} ∪ j;
                j = j + 1;
                Set m to the smallest last OFDM symbol index among all rows of R;
            end while
        end if
        n_D = n_D + 1;
    end if
end while
end if
```

Pseudo code-3

```
Set R to the set of rows
Set C(R) to the cardinality of R
Set r = 0-index of row in set R
Set R_T = ø
Set K_{1T} = ø
while r < C(R)
    Set P_r to the set of entries (e.g., SLIV) for row r
    Set K_{0,r} to the set of K_0 values for entries (e.g., SLIV) for row r
    Set ΔK_{0,r} = max_{K_0}(K_{0,r}) − K_{0,r}
    Set C(P_r) to the cardinality of P_r
    Set C(ΔK_{0,r}) to the cardinality of ΔK_{0,r}
    Set p = 0-index of element in P_r
    set d = 0-index of element in ΔK_{0,r}
    while p < C(P_r)
        R_T = R_T ∪ P_r(p);
        p = p + 1;
    end while
    while d < C(P_r)
        K_{1T} = K_{1T} ∪ ((K_1 + ⌈ΔK_{0,r,d} · 2^{μUL−μUL}⌉) ∪ (K_1 +
            ⌊ΔK_{0,r,d} · 2^{μUL−μUL}⌋));
        d = d + 1;
    end while
    r = r + 1;
end while
K_1 = K_{1T};
```

| Pseudo code-4 |
| --- |

```
Set j = 0 - index of occasion for candidate PDSCH reception or SPS PDSCH release
Set B = Ø
Set M_{A,c} = Ø
Set 𝒞(K₁) to the cardinality of set K₁
Set k =0 - index of slot timing values K_{1,k}, in descending order of the slot timing values, in set
  K₁ for serving cell c
If the UE is not configured with the carrier aggregation slot offset parameter (e.g., 3GPP
parameter ca-SlotOffset) for any serving cell of PDSCH receptions and the PUCCH transmission
(e.g., the PUCCH containing HARQ-ACK information)
while k < 𝒞(K₁)
```
$$\text{if mod } (n_U - K_{1,k} + 1, \max(2^{\mu_{UL}-\mu_{DL}}, 1)) = 0$$
```
    Set n_D =0 - index of a downlink slot overlapping with an uplink slot (index of a downlink
      slot within the uplink slot), e.g., uplink slot n_U − K_{1,k}
```
$$\text{while } n_D < \max(2^{\mu_{DL}-\mu_{UL}}, 1)$$
```
      Set R to the set of rows, e.g., the set of rows configured by a TDRA table
      Set 𝒞(r) to the cardinality of set R
      Set r=0 - index of row in set R
      if slot n_U starts at a same time as or after a slot (or time) for an active downlink BWP
        change on serving cell c or an active uplink BWP change on the Pcell and slot
        ⌊(n_U − K_{1,k}) · 2^{μ_DL-μ_UL}⌋ + n_D is before the slot (or time) for the active downlink
        BWP change on serving cell c or the active uplink BWP change on the Pcell,
        n_D = n_D + 1;
      else
        while r < 𝒞(R)
          if the UE is configured with tdd-UL-DL-ConfigurationCommon, or
            tdd-UL-DL-ConfigurationDedicated and, for each slot from slot (n_U − K_{1,k}) ·
            2^{μ_DL-μ_UL}⌋ + n_D − N_PDSCH^{repeat,max} + 1 to slot ⌊(n_U − K_{1,k}) · 2^{μ_DL-μ_UL}⌋ + n_D, at
            least one symbol of the PDSCH time domain resource corresponding to row r
            is configured as uplink, whereis the k-th slot timing value in set K₁ ,
            or HARQ-ACK information for the PDSCH corresponding to row r (e.g., PDSCH
            in slot n_D) cannot be reported (or transmitted) in slot n_U
            R = R\r ;
          else
            r = r + 1;
          end if
        end while
        if the UE does not indicate a capability to receive more than one unicast PDSCH per
          slot and R ≠ Ø ,
          M_{A,c} = M_{A,c} ∪ j ;
          j = j + 1 ;
        else
          Set 𝒞(R) to the cardinality of set R
          Set m to the smallest last OFDM symbol index, as determined by the SLIV,
            among all rows of R
          while R≠Ø
            Set r =0
            while r < 𝒞(R)
              if S ≤ m for start symbol index S for row r
                b_{r,k,n_D} = j ; - index of occasion for candidate PDSCH reception or SPS
                  PDSCH release for row r
                R = R\r ;
                B = B∪b_{r,k,n_D} ;
              else
                r = r + 1;
              end if
            end while
            M_{A,c} = M_{A,c} ∪ j;
            j = j + 1 ;
            Set m to the smallest last OFDM symbol index among all rows of R;
          end while
        end if
        n_D = n_D + 1;
      end if
    end while
  end if
  k = k +1 ;
end while
else
while k < 𝒞(K₁)
```

$$\text{if mod}\left(n_{ij} - K_{1,k} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$$

```
  Set n_D = 0 - index of a downlink slot overlapping with an uplink slot (index of a downlink
    slot within the uplink slot), e.g., uplink slot n_U − K_{1,k}
```

-continued

Pseudo code-4

```
while n_D < max(2^{μDL-μUL}, 1)
    Set R to the set of rows, e.g., the set of rows configured by a TDRA table
    Set 𝒞(R) to the cardinality of set R
    Set r =0 - index of row in set R
    if slot n_U starts at a same time as or after a slot (or time) for an active downlink BWP
        change on serving cell c or an active uplink BWP change on the Pcell and slot
```

$$\lfloor (n_U - K_{1,k}) \cdot 2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D \text{ is before the}$$

```
        slot (or time) for the active downlink BWP change on serving cell c or the active
        uplink BWP change on the Pcell
        n_D = n_D + 1;
    else
        while r < 𝒞(R)
            if the UE is configured with tdd-UL-DL-ConfigurationCommon, or
                tdd-UL-DL-ConfigurationDedicated and, for each slot from slot ⌊(n_U − K_{1,k}) ·
```

$$2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D - N^{repeat,max}_{PDSCH} + 1 \text{ to slot}$$

$$\lfloor (n_U - K_{1,k}) \cdot 2^{\mu_{DL}-\mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D, \text{ at}$$

```
                least one symbol of the PDSCH time domain resource corresponding to row r is
                configured as uplink, where K_{1,k} is the k-th slot timing value in set K_1 ,
            or HARQ-ACK information for the PDSCH corresponding to row r (e.g., PDSCH
                in slot n_D) cannot be reported (or transmitted) in slot n_U
                R = R\r ;
            else
                r = r + 1 ;
            end if
        end while
        if the UE does not indicate a capability to receive more than one unicast PDSCH per
            slot and R ≠ ∅ ,
            M_{A,c} = M_{A,c} ∪ j ;
            j = j + 1 ;
        else
            Set 𝒞(R) to the cardinality of set R
            Set m to the smallest last OFDM symbol index, as determined by the SLIV,
                among all rows of R
            while R≠∅
                Set r =0
                while r < 𝒞(r)
                    if S ≤ m for start symbol index S for row r
                        b_{r,k,n_D} = j ; - index of occasion for candidate PDSCH reception or SPS
                            PDSCH release for row r
                        R=R\r;
                        B = B∪b_{r,k,n_D} ;
                    else
                        r = r +1;
                    end if
                end while
                M_{A,c} = M_{A,c} ∪ j;
                j = j +1 ;
                Set m to the smallest last OFDM symbol index among all rows of R;
            end while
        end if
        n_D = n_D + 1;
    end if
    end while
end if
k =k +1 ;
end while
end if
```

Pseudo code-5

```
Set j = 0 - index of occasion for candidate PDSCH reception or SPS PDSCH release
Set B = ∅
Set M_{A,c} = ∅
Set 𝒞(K_1) to the cardinality of set K_1
```

-continued

Pseudo code-5

Set k =0 - index of slot timing values $K_{1,k}$, in descending order of the slot timing values, in set
$K_1$ for serving cell c
If the UE is not configured with the carrier aggregation slot offset parameter (e.g., 3GPP
parameter ca-SlotOffsef) for any serving cell of PDSCH receptions and the PUCCH transmission
(e.g., the PUCCH containing HARQ-ACK information)
while k < $\mathcal{C}(K_1)$
    if mod $(n_U - K_{1,k} + 1, \max(2^{\mu UL - \mu UL}, 1)) = 0$ or the HARQ-ACK codebook is configured with the
        subslot length parameter (for example, the UE is configured with the 3GPP parameter
        subslotLengthForPUCCH)
        Set $n_D = 0$ - index of a downlink slot overlapping with an uplink slot (index of a downlink
            slot within the uplink slot), e.g., uplink slot $n_U - K_{1,k}$
        Set $N_k$ to a number of downlink slots overlapping with uplink slot $n_U - K_{1,k}$ if the
            HARQ-ACK codebook is configured with the subslot length parameter, otherwise (if
            the HARQ-ACK codebook is not configured with the subslot length parameter), $N_k =$
            $\max(2^{\mu DL - \mu UL}, 1)$
        while $n_D < N_k$
Set R to the set of rows, e.g., the set of rows configured by a TDRA table
Set $\mathcal{C}(R)$ to the cardinality of set R
Set r=0 - index of row in set R
if slot $n_U$ starts at a same time as or after a slot (or time) for an active downlink BWP
    change on serving cell c or an active uplink BWP change on the Pcell and slot
    $n_{0,k} + n_D$ is before the slot (or time) for the active downlink BWP change on
    serving cell c or the active uplink BWP change on the Pcell, where slot $n_{0,k}$ is a
    downlink slot with a smallest index among downlink slots overlapping with uplink
    slot $n_U - K_{1,k}$ (or, within uplink slot $n_U - K_{1,k}$),
        or the HARQ-ACK codebook is configured with the subslot length parameter, and
            downlink slot $n_{0,k} + n_D$ overlaps with uplink slot $n_U - K_{1,k-1}$ and k > 0
        $n_D = n_D + 1$;
    else
        while r < $\mathcal{C}(R)$
            if the UE is configured with tdd-UL-DL-ConfigurationCommon, or
                tdd-UL-DL-ConfigurationDedicated and, for each slot from slot $n_{0,k} + n_D - $
                $N_{PDSCH}^{repeat,max} + 1$ to slot $n_{0,k} + n_D$, at least one symbol of the PDSCH time
                domain resource corresponding to row r is configured as uplink, where $K_{1,k}$ is
                the k-th slot timing value in set $K_1$, where slot $n_{0,k}$ is a downlink slot with a
                smallest index among downlink slots overlapping with uplink slot $n_U - K_{1,k}$
                (or, within uplink slot $n_U - K_{1,k}$),
            or the HARQ-ACK codebook is configured with the subslot length parameter, and
                the end of the PDSCH time domain resource corresponding to row r is not
                within any of uplink slot $n_U - K_{1,l}$, where $0 \leq l < C(K_1)$
            or the HARQ-ACK codebook is not configured with the subslot length parameter,
                and HARQ-ACK information for the PDSCH corresponding to row r (e.g.,
                PDSCH in slot np) cannot be reported (or transmitted) in slot nU
                R = R\r ;
            else
                r = r + 1;
            end if
        end while
        if the UE does not indicate a capability to receive more than one unicast PDSCH per
            slot and R ≠ ∅,
            $M_{A,c} = M_{A,c} \cup j$ ;
            j = j + 1 ;
        else
            Set $\mathcal{C}(R)$ to the cardinality of set R
            Set m to the smallest last OFDM symbol index, as determined by the SLIV,
                among all rows of R
            while R≠∅
                Set r =0
                while r < $\mathcal{C}(R)$
                    if S ≤ m for start symbol index S for row r
                        $b_{r,k,n_D} = J$ ; - index of occasion for candidate PDSCH reception or SPS
                            PDSCH release for row r
                      R = R\r ;
                      B = B∪$b_{r,k,n_D}$ ;
                  else
                      r = r + 1;
                end if
            end while
            $M_{A,c}$ = MA,c ∪j;
            j = j + 1;
            Set m to the smallest last OFDM symbol index among all rows of R;
        end while
        end if -continued Pseudo code-5

```
        n_D = n_D + 1;
      end if
    end while
  end if
  k = k + 1 ;
end while
else
while k < C(K_1)
``` if $\mod\left(n_U - K_{1,k} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0$ or the

```
    HARQ-ACK codebook is configured with the subslot length parameter (for example, the
    UE is configured with the 3GPP parameter subslotLengthForPUCCH)
    Set n_D = 0 - index of a downlink slot overlapping with an uplink slot (index of a downlink
        slot within the uplink slot), e.g., uplink slot n_U - K_{1,k}
    Set N_k to a number of downlink slots overlapping with uplink slot n_U - K_{1,k} if the
        HARQ-ACK codebook is configured with the subslot length parameter, otherwise (if
        the HARQ-ACK codebook is not configured with the subslot length parameter), N_k =
        max (2^{μDL-μUL}, 1)
    while n_D < N_k
        Set R to the set of rows, e.g., the set of rows configured by a TDRA table
        Set C(R) to the cardinality of set R
        Set r=0 - index of row in set R
        if slot n_U starts at a same time as or after a slot (or time) for an active downlink BWP
            change on serving cell c or an active uplink BWP change on the Pcell and slot
            n_{0,k} + n_D is before the slot (or time) for the active downlink BWP change on
            serving cell c or the active uplink BWP change on the Pcell, where slot n_{0,k} is a
            downlink slot with a smallest index among downlink slots overlapping with uplink
            slot n_U - K_{1,k} (or, within uplink slot n_U - K_{1,k}),
        or the HARQ-ACK codebook is configured with the subslot length parameter, and
            downlink slot n_{0,k} + n_D overlaps with uplink slot n_U - K_{1,k-1}, and k > 0
            n_D = n_D + 1;
        else
            while r < C(R)
                if the UE is configured with tdd-UL-DL-ConfigurationCommon, or
                    tdd-UL-DL-ConfigurationDedicated and, for each slot from slot n_{0,k} + n_D -
                    N_{PDSCH}^{repeat,max} + 1 to slot n_{0,k} + n_D, at least one symbol of the PDSCH time
                    domain resource corresponding to row r is configured as uplink, where K_{1,k} is
                    the k-th slot timing value in set K_1 , where slot n_{0,k} is a downlink slot with a
                    smallest index among downlink slots overlapping with uplink slot n_U - K_{1,k}
                    (or, within uplink slot n_U - K_{1,k}),
                or the HARQ-ACK codebook is configured with the subslot length parameter, and
                    the end of the PDSCH time domain resource corresponding to row r is not
                    within any of uplink slot n_U - K_{1,l}, where 0 ≤ l < C(K_1),
                or the HARQ-ACK codebook is not configured with the subslot length parameter,
                    and HARQ-ACK information for the PDSCH corresponding to row r (e.g.,
                    PDSCH in slot n_D) cannot be reported (or transmitted) in slot n_U
                    R = R\r;
                else
                    r = r + 1 ;
                end if
            end while
            if the UE does not indicate a capability to receive more than one unicast PDSCH per
                slot and R ≠ ∅,
                M_{A,c} = M_{A,c} ∪ j ;
                j = j+1 ;
            else
                Set C(R) to the cardinality of set R
                Set m to the smallest last OFDM symbol index, as determined by the SLIV,
                    among all rows of R
                while R≠∅
                    Set r=0
                    while r < C(R)
                        if S ≤ m for start symbol index S for row r
                            b_{r,k,n_D} = j ; - index of occasion for candidate PDSCH reception or SPS
                                PDSCH release for row r
                            R=R\r ;
                            B = B∪b_{r,k,n_D} ;
                        else
                            r = r + 1;
                        end if
                    end while
```

| Pseudo code-5 |
| --- |

```
                M_{A,c} = M_{A,c} ∪ j;
                j = j+1 ;
                Set m to the smallest last OFDM symbol index among all rows of R;
              end while
            end if
          n_D = n_D + 1;
        end if
      end while
    end if
    k = k+1 ;
  end while
end if
```

| Pseudo code-6 |
| --- |

```
Set j=0 - index of occasion for candidate PDSCH reception or SPS PDSCH release
Set B = Ø
Set M_{A,c} = Ø
Set 𝒞(K_1) to the cardinality of set k_1
Set k =0 - index of slot timing values K_{1,k} , in descending order of the slot timing values, in set
K_1 for serving cell c
If the UE is not configured with the carrier aggregation slot offset parameter (e.g., 3GPP
parameter ca-SlotOffsef) for any serving cell of PDSCH receptions and the PUCCH transmission
(e.g., the PUCCH containing HARQ-ACK information)
while k < 𝒞(K_1)
  if mod (n_U − K_{1,k} + 1,max(2^{μUL−μDL} ,1))= 0 or the HARQ-ACK codebook is configured with the
    subslot length parameter (for example, the UE is configured with the 3GPP parameter
    subslotLengthForPUCCH)
    Set n_D = 0 - index of a downlink slot overlapping with an uplink slot (index of a downlink
      slot within the uplink slot), e.g., uplink slot n_U − K_{1,k}
    Set N_k to a number of downlink slots overlapping with uplink slot n_U − K_{1,k} if the
      HARQ-ACK codebook is configured with the subslot length parameter, otherwise (if
      the HARQ-ACK codebook is not configured with the subslot length parameter), N_k =
      max (2^{μDL−μUL} , 1)
    while n_D < N_k
      Set R to the set of rows, e.g., the set of rows configured by a TDRA table
      Set 𝒞(R) to the cardinality of set R
      Set r=0 - index of row in set R
      if slot n_U starts at a same time as or after a slot (or time) for an active downlink BWP
        change on serving cell c or an active uplink BWP change on the Pcell and slot
        n_{0,k} + n_D is before the slot (or time) for the active downlink BWP change on
        serving cell c or the active uplink BWP change on the Pcell, or the HARQ-ACK
        codebook is configured with the subslot length parameter, and downlink slot n_{0,k} +
        n_D overlaps with uplink slot n_U − K_{1,k−1}, and k > 0, where slot n_{0,k} is a
        downlink slot with a smallest index among downlink slots overlapping with uplink
        slot n_U − K_{1,k} (or, within uplink slot n_U − K_{1,k}),
        n_D = n_D + 1;
      else
        while r < 𝒞(R)
          if the UE is configured with tdd-UL-DL-ConfigurationCommon, or
            tdd-UL-DL-ConfigurationDedicated and, for each slot from slot n_{0,k} + n_D −
            N_{PDSCH}^{repeat,max} + 1 to slot n_{0,k} + n_D, at least one symbol of the PDSCH time
            domain resource corresponding to row r is configured as uplink, where K_{1,k} is
            the k-th slot timing value in set K_1 , where slot n_{0,k} is a downlink slot with a
            smallest index among downlink slots overlapping with uplink slot n_U − K_{1,k}
            (or, within uplink slot n_U − K_{1,k}),
            or the HARQ-ACK codebook is not configured with the subslot length parameter,
            and HARQ-ACK information for the PDSCH corresponding to row r (e.g.,
            PDSCH in slot n_D) cannot be reported (or transmitted) in slot n_U
            R = R\r;
          else
            r = r + 1;
          end if
        end while
        if the UE does not indicate a capability to receive more than one unicast PDSCH per
          slot and R ≠ Ø,
          M_{A,c} = M_{A,c} ∪ j ;
          j = j + 1 ;
        else
          Set 𝒞(R) to the cardinality of set R
          Set m to the smallest last OFDM symbol index, as determined by the SLIV,
            among all rows of R
```

-continued

Pseudo code-6

```
                while R≠Ø
                    Set r =0
                    while r < 𝒞(R)
                        if S ≤ m for start symbol index S for row r
                            b_{r,k,n_D} = j ; - index of occasion for candidate PDSCH reception or SPS
                                PDSCH release for row r
                            R = R\r ;
                            B = B∪b_{r,k,n_D} ;
                        else
                            r = r + 1;
                        end if
                    end while
                    M_{A,c} = M_{A,c} ∪ j;
                    j = j+1 ;
                    Set m to the smallest last OFDM symbol index among all rows of R;
                end while
            end if
            n_D = n_D + 1;
        end if
    end while
 end if
 k = k + 1 ;
end while
else
 while k < 𝒞(K_1)
```

$$\text{if } \mod\left(n_U - K_{1,k} + \left\lfloor\left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}}\right\rfloor + 1, \max\ (2^{\mu_{UL}-\mu_{DL}}, 1)\right) = 0 \text{ or the}$$

```
        HARQ-ACK codebook is configured with the subslot length parameter (for example, the
        UE is configured with the 3GPP parameter subslotLengthForPUCCH)
    Set n_D = 0 - index of a downlink slot overlapping with an uplink slot (index of a downlink
        slot within the uplink slot), e.g., uplink slot n_U − K_{1,k}
    Set N_k to a number of downlink slots overlapping with uplink slot n_U − K_{1,k} if the
        HARQ-ACK codebook is configured with the subslot length parameter, otherwise (if
        the HARQ-ACK codebook is not configured with the subslot length parameter), N_k =
        max (2^{μDL-μUL}, 1)
    while n_D < N_k
        Set R to the set of rows, e.g., the set of rows configured by a TDRA table
        Set 𝒞(R) to the cardinality of set R
        Set r=0 - index of row in set R
        if slot n_U starts at a same time as or after a slot (or time) for an active downlink BWP
            change on serving cell c or an active uplink BWP change on the Pcell and slot
            n_{0,k} + n_D is before the slot (or time) for the active downlink BWP change on
            serving cell c or the active uplink BWP change on the Pcell, or the HARQ-ACK
            codebook is configured with the subslot length parameter, and downlink slot n_{0,k} +
            n_D overlaps with uplink slot n_U − K_{1,k−1}, and k > 0, where slot n_{0,k} is a
            downlink slot with a smallest index among downlink slots overlapping with uplink
            slot n_U − K_{1,k} (or, within uplink slot n_U − K_{1,k}),
            n_D = n_D + 1;
        else
            while r < 𝒞(R)
                if the UE is configured with tdd-UL-DL-ConfigurationCommon, or
                    tdd-UL-DL-ConfigurationDedicated and, for each slot from slot n_{0,k} + n_D −
                    N_{PDSCH}^{repeat,max} + 1 to slot n_{0,k} + n_D, at least one symbol of the PDSCH time
                    domain resource corresponding to row r is configured as uplink, where K_{1,k} is
                    the k-th slot timing value in set K_1 , where slot n_{0,k} is a downlink slot with a
                    smallest index among downlink slots overlapping with uplink slot n_U − K_{1,k}
                    (or, within uplink slot n_U − K_{1,k}), or the HARQ-ACK codebook is not
                    configured with the subslot length parameter, and HARQ-ACK information for
                    the PDSCH corresponding to row r (e.g., PDSCH in slot n_D) cannot be
                    reported (or transmitted) in slot n_U
                    R = R\r;
                else
                    r = r + 1 ;
                end if
            end while
            if the UE does not indicate a capability to receive more than one unicast PDSCH per
                slot and R ≠ Ø ,
                M_{A,c} = M_{A,c} ∪ j ;
                j = j+1
            else
                Set 𝒞(R) to the cardinality of set R
                Set m to the smallest last OFDM symbol index, as determined by the SLIV,
                    among all rows of R
```

| Pseudo code-6 |
| --- |

```
            while R ≠ Ø
                Set r=0
                while r < 𝒞(R)
                    if S ≤ m for start symbol index S for row r
                        b_{r,k,n_D} = j ; - index of occasion for candidate PDSCH reception or SPS
                            PDSCH release for row r
                        R=R\r ;
                        B = B∪b_{r,k,n_D} ;
                    else
                        r = r+1;
                    end if
                end while
                M_{A,c} = M_{A,c} ∪ j;
                j = j+1 ;
                Set m to the smallest last OFDM symbol index among all rows of R;
            end while
        end if
        n_D = n_D + 1;
    end if
  end while
 end if
 k =k +1 ;
end while
end if
```

| Pseudo code-6a |
| --- |

Set j = 0 - index of occasion for candidate PDSCH reception or SPS PDSCH release
Set B = Ø
Set $M_{A,c}$ = Ø
Set $𝒞(K_1)$ to the cardinality of set $K_1$
Set k =0 - index of slot timing values $K_{1,k}$, in descending order of the slot timing values, in set $K_1$ for serving cell c
If the UE is not configured with the carrier aggregation slot offset parameter (e.g., 3GPP parameter ca-SlotOffsef) for any serving cell of PDSCH receptions and the PUCCH transmission (e.g., the PUCCH containing HARQ-ACK information)
while k < $𝒞(K_1)$
    if mod $(n_U - K_{1,k} +1, \max(2^{\mu UL-\mu DL},1))$= 0 or the HARQ-ACK codebook is configured with the
        subslot length parameter (for example, the UE is configured with the 3GPP parameter subslotLengthForPUCCH)
        Set $n_D$ = 0 - index of a downlink slot overlapping with an uplink slot (index of a downlink slot within the uplink slot), e.g., uplink slot $n_U - K_{1,k}$
        Set $N_k$ to a number of downlink slots overlapping with uplink slot $n_U - K_{1,k}$ if the HARQ-ACK codebook is configured with the subslot length parameter, otherwise (if the HARQ-ACK codebook is not configured with the subslot length parameter), $N_k$ = max $(2^{\mu DL-\mu UL}, 1)$
        while $n_D < N_k$
            Set R to the set of rows, e.g., the set of rows configured by a TDRA table
            Set $𝒞(R)$ to the cardinality of set R
            Set r=0 - index of row in set R
            if slot $n_U$ starts at a same time as or after a slot (or time) for an active downlink BWP change on serving cell c or an active uplink BWP change on the Pcell and slot $n_{0,k} + n_D$ is before the slot (or time) for the active downlink BWP change on serving cell c or the active uplink BWP change on the Pcell, or the HARQ-ACK codebook is configured with the subslot length parameter, and downlink slot $n_{0,k} + n_D$ overlaps with uplink slot $n_U - K_{1,k-1}$, and k > 0, where slot $n_{0,k}$ is a downlink slot with a smallest index among downlink slots overlapping with uplink slot $n_U - K_{1,k}$ (or, within uplink slot $n_U - K_{1,k}$),
                $n_D = n_D + 1$;
            else
                while r < $𝒞(R)$
                    if the UE is configured with tdd-UL-DL-ConfigurationCommon, or tdd-UL-DL-ConfigurationDedicated and, for each slot from slot $n_{0,k} + n_D - N_{PDSCH}^{repeat,max} + 1$ to slot $n_{0,k} + n_D$, at least one symbol of the PDSCH time domain resource corresponding to row r is configured as uplink, where $K_{1,k}$ is the k-th slot timing value in set $K_1$, where slot $n_{0,k}$ is a downlink slot with a smallest index among downlink slots overlapping with uplink slot $n_U - K_{1,k}$ (or, within uplink slot $n_U - K_{1,k}$),
                or HARQ-ACK information for the PDSCH corresponding to row r (e.g., PDSCH in slot $n_D$) cannot be reported (or transmitted) in slot $n_U$
                R=R\r ;

-continued

Pseudo code-6a

```
        else
            r = r + 1 ;
        end if
    end while
    if the UE does not indicate a capability to receive more than one unicast PDSCH per
        slot and R ≠ Ø ,
        M_{A,c} = M_{A,c} ∪ j ;
        j = j+1 ;
    else
        Set 𝒞(R) to the cardinality of set R
        Set m to the smallest last OFDM symbol index, as determined by the SLIV,
            among all rows of R
        while R≠Ø
            Set r=0
            while r < 𝒞(R)
                if S ≤ m for start symbol index S for row r
                    b_{r,k,n_D} = j ; - index of occasion for candidate PDSCH reception or SPS
                        PDSCH release for row r
                    R = R\r ;
                    B = B∪b_{r,k,n,D} ;
                else
                    r = r +1 ;
                end if
            end while
            M_{A,c} = M_{A,c} ∪j;
            j = j + 1 ;
            Set m to the smallest last OFDM symbol index among all rows of R;
        end while
    end if
    n_D = n_D + 1;
        end if
    end while
end if
k = k +1 ;
end while
else
while k < 𝒞(K_1)
```

$$\text{if } \mod\left(n_U - K_{1,k} + \left\lfloor \left(\frac{N^{UL}_{slot,offset}}{2^{\mu_{offset,UL}}} - \frac{N^{DL}_{slot,offset,c}}{2^{\mu_{offset,DL,c}}}\right) \cdot 2^{\mu_{UL}} \right\rfloor + 1, \max(2^{\mu_{UL}-\mu_{DL}}, 1)\right) = 0 \text{ or the}$$

HARQ-ACK codebook is configured with the subslot length parameter (for example, the
UE is configured with the 3GPP parameter subslotLengthForPUCCH)
Set $n_D = 0$ - index of a downlink slot overlapping with an uplink slot (index of a downlink
    slot within the uplink slot), e.g., uplink slot $n_U - K_{1,k}$
Set $N_k$ to a number of downlink slots overlapping with uplink slot $n_U - K_{1,k}$ if the
    HARQ-ACK codebook is configured with the subslot length parameter, otherwise (if
    the HARQ-ACK codebook is not configured with the subslot length parameter), $N_k =$
    max ($2^{\mu_{DL}-\mu_{UL}}$, 1)
while $n_D < N_k$
    Set R to the set of rows, e.g., the set of rows configured by a TDRA table
    Set 𝒞(R) to the cardinality of set R
    Set r=0 - index of row in set R
    if slot $n_U$ starts at a same time as or after a slot (or time) for an active downlink BWP
        change on serving cell c or an active uplink BWP change on the Pcell and slot
        $n_{0,k} + n_D$ is before the slot (or time) for the active downlink BWP change on
        serving cell c or the active uplink BWP change on the Pcell, or the HARQ-ACK
        codebook is configured with the subslot length parameter, and downlink slot $n_{0,k} +$
        $n_D$ overlaps with uplink slot $n_U - K_{1,k-1}$, and k > 0, where slot $n_{0,k}$ is a
        downlink slot with a smallest index among downlink slots overlapping with uplink
        slot $n_U - K_{1,k}$ (or, within uplink slot $n_U - K_{1,k}$),
        $n_D = n_D + 1$;
    else
        while r < 𝒞(R)
            if the UE is configured with tdd-UL-DL-ConfigurationCommon, or
                tdd-UL-DL-ConfigurationDedicated and, for each slot from slot $n_{0,k} + n_D -$
                $N_{PDSCHrepeat,max} + 1$ to slot $n_{0,k} + n_D$, at least one symbol of the PDSCH time
                domain resource corresponding to row r is configured as uplink, where $K_{1,k}$ is
                the k-th slot timing value in set $K_1$ , where slot $n_{0,k}$ is a downlink slot with a
                smallest index among downlink slots overlapping with uplink slot $n_U - K_{1,k}$
                (or, within uplink slot $n_U - K_{1,k}$), or HARQ-ACK information for the PDSCH
                corresponding to row r (e.g., PDSCH in slot np) cannot be reported (or
                transmitted) in slot $n_U$
                R=R\r ;

| Pseudo code-6a |
|---|
| ```
            else
                r = r + 1 ;
            end if
        end while
        if the UE does not indicate a capability to receive more than one unicast PDSCH per
            slot and R ≠ ∅ ,
            M_{A,c} = M_{A,c} ∪ j ;
            j = j+1 ;
        else
            Set 𝒞(R) to the cardinality of set R
            Set m to the smallest last OFDM symbol index, as determined by the SLIV,
                among all rows of R
            while R≠∅
                Set r=0
                while r < 𝒞(R)
                    if S ≤ m for start symbol index S for row r
                        b_{r,k,n_D} = j ; - index of occasion for candidate PDSCH reception or SPS
                            PDSCH release for row r
                        R=R\r ;
                        B = B∪)b_{r,k,n_D} ;
                    else
                        r = r +1;
                    end if
                end while
                M_{A,c} = M_{A,c} ∪ j;
                j = j +1;
                Set m to the smallest last OFDM symbol index among all rows of R;
            end while
        end if
        n_D = n_D + 1;
      end if
    end while
  end if
  k = k +1 ;
end while
end if
``` |

| Pseudo code-7 |
|---|
| Set j = 0 — index of occasion for candidate PDSCH reception or SPS PDSCH release
Set B = ∅
Set $M_{A,c}$= ∅
Set 𝒞($K_1$) to the cardinality of set $K_1$
Set k =0 — index of slot timing values $K_{1,k}$, in descending order of the slot timing values, in set
  $K_1$ for serving cell c
If the UE is not configured with the carrier aggregation slot offset parameter (e.g., 3GPP
parameter ca-SlotOffset) for any serving cell of PDSCH receptions and the PUCCH transmission
(e.g., the PUCCH containing HARQ-ACK information)
while k < 𝒞($K_1$)
  if mod ($n_U - K_{1,k} + 1$, max($2^{\mu UL-\mu DL}$,1))= 0
    Set $n_D$ = 0 — index of a downlink slot overlapping with an uplink slot (index of a downlink
      slot within the uplink slot), e.g., uplink slot $n_U - K_{1,k}$
    while $n_D$ < max($2^{\mu DL-\mu UL}$, 1)
      Set R to the set of rows, e.g., the set of rows configured by a TDRA table
      Set 𝒞(R) to the cardinality of set R
      Set r=0 — index of row in set R
      if slot nU starts at a same time as or after a slot (or time) for an active downlink BWP
        change on serving cell c or an active uplink BWP change on the Pcell and slot
        $\lfloor(n_U - K_{1,k}) \cdot 2^{\mu DL-\mu UL}\rfloor + n_D$ is before the slot (or time) for the active downlink
        BWP change on serving cell c or the active uplink BWP change on the Pcell,
        $n_D = n_D + 1$;
      else
        while r < 𝒞(R)
          if the UE is not configured with a parameter enabling time domain HARQ
            bundling (e.g., 3GPP parameter enableTimeDomainHARQ-Bundling), and the
            UE is configured with tdd-UL-DL-ConfigurationCommon, or
            tdd-UL-DL-ConfigurationDedicated and, for each slot from slot
            $\lfloor(n_U - K_{1,k}) \cdot 2^{\mu DL-\mu UL}\rfloor + n_D - N_{PDSCH}^{repeat,max} + n_D$, at
            least one symbol of the PDSCH time domain resource corresponding to row r
            is configured as uplink, where $K_{1,k}$ is the k-th slot timing value in set $K_1$,
            or HARQ-ACK information for the PDSCH corresponding to row r (e.g., PDSCH
            in slot $\lfloor(n_U - K_{1,k}) \cdot 2^{\mu DL-\mu UL}\rfloor + n_D$) cannot be reported (or transmitted) in
            slot $n_U$
            R = R\r; |

-continued

Pseudo code-7

```
        elseif the parameter enabling time domain HARQ bundling (e.g., 3GPP parameter
            enableTimeDomainHARQ-Bundling) is configured, and the UE is configured
            with tdd-UL-DL-ConfigurationCommon, or tdd-UL-DL-ConfigurationDedicated and,
            for each slot in slot ⌊(n_U − K_{1,k}) · 2^{μDL−μUL}⌋ + n_D − ΔK_{0,r}(d), at least one symbol of
            the PDSCH time domain
            resource corresponding to row r of set R' is configured as uplink, where K_{1,k}
            is the k-th slot timing value in set K_1 , ΔK_{0,r}(d) is a difference between a
            maximum value of K0 and K0 of an entry with an index of d of row r, and
            d = 0,1,...,C(ΔK_{0,r}) − 1
            R = R\r;
            R' = R'\r;
        else
            r = r + 1;
        end if
    end while
    if the UE does not indicate a capability to receive more than one unicast PDSCH per
        slot and R≠∅,
        M_{A,c} = M_{A,c} ∪ j;
        j = j + 1;
    else
        Set ∉(R) to the cardinality of set R
        Set m to the smallest last OFDM symbol index, as determined by the SLIV,
            among all rows of R
        while R≠∅
            Set r=0
            while r < ∉(R)
            if S ≤ m for start symbol index S for row r
                b_{r,k,n_D} = j; index of occasion for candidate PDSCH reception or SPS
                    PDSCH release for row r
                R = R\r;
                B = B ∪ b_{r,k,n_D};
            else
                r = r + 1;
            end if
            end while
            M_{A,c} = M_{A,c} ∪ j;
            j = j + 1;
            Set m to the smallest last OFDM symbol index among all rows of R;
        end while
        end if
        n_D = n_D + 1;
    end if
    end while
end if
k = k + 1 ;
end while
else
while k < ∉(K_1)
```

$$\text{if } \mod\left( n_U - K_{1,k} + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{UL}} \right\rfloor + 1, \max(2^{\mu_{UL}-\mu_{DL}}, 1) \right) = 0$$

```
    Set n_D = 0 — index of a downlink slot overlapping with an uplink slot (index of a downlink
        slot within the uplink slot), e.g., uplink slot n_U − K_{1,k}
    while n_D < max(2^{μDL−μUL}, 1)
        Set R to the set of rows, e.g., the set of rows configured by a TDRA table
        Set ∉(R) to the cardinality of set R
        Set r=0 — index of row in set R
        if slot n_U starts at a same time as or after a slot (or time) for an active downlink BWP
            change on serving cell c or an active uplink BWP change on the Pcell and slot
```

$$\lfloor (n_U - K_{1,k}) \cdot 2^{\mu_{UL}-\mu_{DL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$$

```
            is before the slot (or time) for the active downlink BWP change on serving cell c or
            the active uplink BWP change on the Pcell,
            n_D = n_D + 1;
        else
            while r < ∉(R)
            if the UE is not configured with the parameter enabling time domain HARQ
                bundling (e.g., 3GPP parameter enableTimeDomainHARQ-Bundling), and the
                UE is configured with tdd-UL-DL-ConfigurationCommon, or
                tdd-UL-DL-ConfigurationDedicated and, for each slot from slot
```

Pseudo code-7

$$\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D - N^{repeat,max}_{PDSCH} + 1$$

to slot $\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$, at least one symbol of the PDSCH time domain resource corresponding to row r is
    configured as uplink, where $K_{1,k}$ is the k-th slot timing value in set $K_1$,
    or HARQ-ACK information for the PDSCH corresponding to row r (e.g., PDSCH in slot $\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D$)

cannot be reported (or transmitted) in slot $n_U$
    R = R\r ;
  elseif the parameter enabling time domain HARQ bundling (e.g., 3GPP parameter
    enableTimeDomainHARQ-Bundling) is configured, and the UE is configured
    with tdd-UL-DL-ConfigurationCommon, or tdd-UL-DL-ConfigurationDedicated and,
    for each slot in slot $$\lfloor (n_U - K_{1,k}) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{DL}} \right\rfloor + n_D - \Delta K_{0,r}(d),$$

at least one symbol of the PDSCH time domain resource corresponding to row r of set R'
    is configured as uplink, where $K_{1,k}$ is the k-th slot timing value in set $K_1$,
    $\Delta K_{0,r}(d)$ is a difference between a maximum value of K0 and K0 of an entry
    with an index of d of row r, and $d = 0,1,...,C(\Delta K_{0,r}) - 1$
    R = R\r;
    R' = R'\r;
  else
    r = r + 1 ;
  end if
end while
if the UE does not indicate a capability to receive more than one unicast PDSCH per
  slot and R ≠ ∅,
  $M_{A,c} = M_{A,c} \cup j$;
  j = j + 1;
else
  Set ⊄(R) to the cardinality of set R
  Set m to the smallest last OFDM symbol index, as determined by the SLIV,
    among all rows of R
  while R ≠ ∅
    Set r=0
    while r < ⊄(R)
      if S ≤m for start symbol index S for row r
        $b_{r,k,n_D} = j$; — index of occasion for candidate PDSCH reception or SPS
          PDSCH release for row r
        R=R\r;
        $B = B \cup b_{r,k,n_D}$ ;
      else
        r = r + 1;
      end if
    end while
    $M_{A,c} = M_{A,c} \cup j$;
    j = j + 1;
        Set m to the smallest last OFDM symbol index among all rows of R;
      end while
      end if
      $n_D = n_D + 1$;
    end if
  end while
  end if
  k = k + 1 ;
end while
end if

| Pseudo code-8 |
|---|

```
Set c = 0 – serving cell index
Set j = 0 – HARQ-ACK information bit index
Set N_cells^DL to the number of serving cells configured by higher layer signaling for the UE
   while c < N_cells^DL
      Set m = 0 – index of candidate PDSCH reception
      while m < M_c
         if a parameter enabling time domain HARQ bundling (e.g., 3GPP parameter
            enableTimeDomainHARQ-Bundling) is provided for serving cell c, and a PDSCH is
            scheduled by a DCI format indicating a row (e.g., row r) in the time domain resource
            allocation table that includes more than one SLIV
               if the PDSCH is associated with the last SLIV in the row (e.g., if time domain
                  resources of the PDSCH are determined by the last SLIV in the row (e.g., row
                  r))
                  õ_j^ACK = result of binary AND operation of the HARQ-ACK information bits
                     corresponding to (all) transport blocks in PDSCHs, that do not overlap with an
                     uplink symbol configured by higher layer signalling (e.g., 3GPP parameter
                     tdd-UL-DL-ConfigurationCommon or tdd-UL-DL-ConfigurationDedicated), on
                     serving cell c;
                  j = j + 1;
               else
                  õ_j^ACK = NACK;
                  j = j + 1;
               end if
         end if
      end while
      c = c + 1;
   end while
```

| Pseudo code-9 |
|---|

```
Set c = 0 – serving cell index
Set j = 0 – HARQ-ACK information bit index
Set N_cells^DL to the number of serving cells configured by higher layer signaling for the UE
   while c < N_cells^DL
      Set m = 0 – index of candidate PDSCH reception
      while m < M_c
         if a parameter enabling time domain HARQ bundling (e.g., 3GPP parameter
            enableTimeDomainHARQ-Bundling) is provided for serving cell c, and a PDSCH is
            scheduled by a DCI format
            if harq-ACK-SpatialBundlingPUCCH is not configured and the UE is configured (for
               example, by 3GPP parameter maxNrofCodeWordsScheduledByDCI) with
               reception of two transport blocks for the active downlink BWP of serving cell c
               if the PDSCH is associated with the last SLIV in the row (e.g., if time domain
                  resources of the PDSCH are determined by the last SLIV in the row (e.g., row
                  r))
                  õ_j^ACK = result of binary AND operation of the HARQ-ACK information bits
                     corresponding to (all) first transport blocks in PDSCHs, that do not overlap
                     with an uplink symbol configured by higher layer signalling (e.g., 3GPP
                     parameter tdd-UL-DL-ConfigurationCommon or
                     tdd-UL-DL-ConfigurationDedicated), on serving cell c;
               else
                  õ_j^ACK = NACK;
               end if
               j = j + 1;
               if the PDSCH is associated with the last SLIV in the row (e.g., if time domain
                  resources of the PDSCH are determined by the last SLIV in the row (e.g., row
                  r))
                  õ_j^ACK = result of binary AND operation of the HARQ-ACK information bits
                     corresponding to (all) second transport blocks in PDSCHs, that do not overlap
                     with an uplink symbol configured by higher layer signalling (e.g., 3GPP
                     parameter tdd-UL-DL-ConfigurationCommon or
                     tdd-UL-DL-ConfigurationDedicated), on serving cell c;
               else
                  õ_j^ACK = NACK;
               j = j + 1;
            elseif harq-ACK-SpatialBundlingPUCCH is configured and the UE is configured
               (for example, by 3GPP parameter maxNrofCodeWordsScheduledByDCI) with
               reception of two transport blocks for the active downlink BWP of serving cell c
               if the PDSCH is associated with the last SLIV in the row (e.g., if time domain
                  resources of the PDSCH are determined by the last SLIV in the row (e.g., row r))
                  õ_j^ACK = result of binary AND operation of the HARQ-ACK information bits
                     corresponding to (all) transport blocks in PDSCHs, that do not overlap with an
                     uplink symbol configured by higher layer signalling (e.g., 3GPP parameter
```

| Pseudo code-9 |
|---|

```
            tdd-UL-DL-ConfigurationCommon or tdd-UL-DL-ConfigurationDedicated), on
            serving cell c, where, if the PDSCH received by the UE only contains one
            transport block, the UE assumes ACK for the second transport block
          else
            õ_j^ACK = NACK;
          end if
          j = j + 1;
        else
          if the PDSCH is associated with the last SLIV in the row (e.g., if time domain
            resources of the PDSCH are determined by the last SLIV in the row (e.g., row
            r))
            õ_j^ACK = binary AND operation of the HARQ-ACK information bits
            corresponding to (all) transport blocks in PDSCHs, that do not overlap with an
            uplink symbol configured by higher layer signalling (e.g., 3GPP parameter
            tdd-UL-DL-ConfigurationCommon or tdd-UL-DL-ConfigurationDedicated), on
            serving cell c
          else
            õ_j^ACK = NACK;
          end if
          j = j + 1;
        end if
      end if
    end while
    c = c + 1;
end while
```

| Pseudo code-10 |
|---|

```
Set c = 0 – serving cell index
Set j = 0 – HARQ-ACK information bit index
Set N_cells^DL to the number of serving cells configured by higher layer signaling for the UE
  while c < N_cells DL
    Set m = 0 – index of candidate PDSCH reception
    while m < M_c
      if a parameter enabling time domain HARQ bundling (e.g., 3GPP parameter
        enableTimeDomainHARQ-Bundling) is provided for serving cell c, and a PDSCH is
        scheduled by a DCI format
        if harq-ACK-SpatialBundlingPUCCH is not configured and the UE is configured (for
          example, by 3GPP parameter maxNrofCodeWordsScheduledByDCI) with
          reception of two transport blocks for the active downlink BWP of serving cell c
          if the PDSCH is associated with the last SLIV in the row (e.g., if time domain
            resources of the PDSCH are determined by the last SLIV in the row (e.g., row
            r))
            õ_j^ACK = result of binary AND operation of the HARQ-ACK information bits
            corresponding to (all) first transport blocks in PDSCHs, that do not overlap
            with an uplink symbol configured by higher layer signalling (e.g., 3GPP
            parameter tdd-UL-DL-ConfigurationCommon or
            tdd-UL-DL-ConfigurationDedicated), on serving cell c;
            j = j + 1;
            õ_j^ACK = result of binary AND operation of the HARQ-ACK information bits
            corresponding to (all) second transport blocks in PDSCHs, that do not overlap
            with an uplink symbol configured by higher layer signalling (e.g., 3GPP
            parameter tdd-UL-DL-ConfigurationCommon or
            tdd-UL-DL-ConfigurationDedicated), on serving cell c;
            j = j + 1;
          else
            õ_j^ACK = NACK;
            j = j + 1;
            õ_j^ACK = NACK;
            j = j + 1;
          end if
        elseif harq-ACK-SpatialBundlingPUCCH is configured and the UE is configured
          (for example, by 3GPP parameter maxNrofCodeWordsScheduledByDCI) with
          reception of two transport blocks for the active downlink BWP of serving cell c
          if the PDSCH is associated with the last SLIV in the row (e.g., if time domain
            resources of the PDSCH are determined by the last SLIV in the row (e.g., row
            r))
            õ_j^ACK = result of binary AND operation of the HARQ-ACK information bits
            corresponding to (all) transport blocks in PDSCHs, that do not overlap with an
            uplink symbol configured by higher layer signalling (e.g., 3GPP parameter
            tdd-UL-DL-ConfigurationCommon or tdd-UL-DL-ConfigurationDedicated), on
            serving cell c, where, if the PDSCH received by the UE only contains one
            transport block, the UE assumes ACK for the second transport block
```

| Pseudo code-10 |
|---|

```
        else
            õ_j^ACK = NACK;
        end if
        j = j + 1;
    else
        if the PDSCH is associated with the last SLIV in the row (e.g., if time domain
            resources of the PDSCH are determined by the last SLIV in the row (e.g., row
            r))
            õ_j^ACK = binary AND operation of the HARQ-ACK information bits
                corresponding to (all) transport blocks in PDSCHs, that do not overlap with an
                uplink symbol configured by higher layer signalling (e.g., 3GPP parameter
                tdd-UL-DL-ConfigurationCommon or tdd-UL-DL-ConfigurationDedicated), on
                serving cell c
        else
            õ_j^ACK = NACK;
        end if
        j = j + 1;
    end if
  end if
 end while
 c = c + 1;
end while
```

| Pseudo code-11 |
|---|

```
Set c = 0 - serving cell index
Set j = 0 - HARQ-ACK information bit index
Set N_cells^DL to the number of serving cells configured by higher layer signaling for the UE
while c < N_cells^DL
    Set m = 0 - index of candidate PDSCH reception
    while m < M_c
        if a parameter enabling time domain HARQ bundling (e.g., 3GPP parameter
            enableTimeDomainHARQ-Bundling) is provided for serving cell c, and a PDSCH is
            scheduled by a DCI format
            if harq-ACK-SpatialBundlingPUCCH is not configured and the UE is configured (for
                example, by 3GPP parameter maxNrofCodeWordsScheduledByDCI) with
                reception of two transport blocks for the active downlink BWP of serving cell c
                if the PDSCH is associated with the last SLIV in the row (e.g., if time domain
                    resources of the PDSCH are determined by the last SLIV in the row (e.g., row
                    r))
                    õ_j^ACK = result of binary AND operation of the HARQ-ACK information bits
                        corresponding to (all) first transport blocks in PDSCHs, that do not overlap
                        with an uplink symbol configured by higher layer signalling (e.g., 3GPP
                        parameter tdd-UL-DL-ConfigurationCommon or
                        tdd-UL-DL-ConfigurationDedicated), on serving cell c;
                    j = j + 1;
                    õ_j^ACK = result of binary AND operation of the HARQ-ACK information bits
                        corresponding to (all) second transport blocks in PDSCHs, that do not overlap
                        with an uplink symbol configured by higher layer signalling (e.g., 3GPP
                        parameter tdd-UL-DL-ConfigurationCommon or
                        tdd-UL-DL-ConfigurationDedicated), on serving cell c;
                else
                    õ_j^ACK = NACK;
                    j = j + 1;
                    õ_j^ACK = NACK;
                end if
                j = j + 1;
            elseif harq-ACK-SpatialBundlingPUCCH is configured and the UE is configured
                (for example, by 3GPP parameter maxNrofCodeWordsScheduledByDCI) with
                reception of two transport blocks for the active downlink BWP of serving cell c
                if the PDSCH is associated with the last SLIV in the row (e.g., if time domain
                    resources of the PDSCH are determined by the last SLIV in the row (e.g., row
                    r))
                    õ_j^ACK = result of binary AND operation of the HARQ-ACK information bits
                        corresponding to (all) transport blocks in PDSCHs, that do not overlap with an
                        uplink symbol configured by higher layer signalling (e.g., 3GPP parameter
                        tdd-UL-DL-ConfigurationCommon or tdd-UL-DL-ConfigurationDedicated), on
                        serving cell c, where, if the PDSCH received by the UE only contains one
                        transport block, the UE assumes ACK for the second transport block
                else
                    õ_j^ACK = NACK;
                end if
                j = j + 1;
```

| Pseudo code-11 |
| --- |

```
        else
            if the PDSCH is associated with the last SLIV in the row (e.g., if time domain
                resources of the PDSCH are determined by the last SLIV in the row (e.g., row
                r))
                õ_j^ACK = binary AND operation of the HARQ-ACK information bits
                corresponding to (all) transport blocks in PDSCHs, that do not overlap with an
                uplink symbol configured by higher layer signalling (e.g., 3GPP parameter
                tdd-UL-DL-ConfigurationCommon or tdd-UL-DL-ConfigurationDedicated), on
                serving cell c
            else
                õ_j^ACK = NACK;
            end if
            j = j + 1;
        end if
    end if
  end while
  c = c + 1;
end while
```

| Pseudo code-12 |
| --- |

Set j = 0 — index of occasion for candidate PDSCH reception or SPS PDSCH release
Set B = Ø
Set $M_{A,c}$ = Ø
Set ⟨$K_1$⟩ to the cardinality of set $K_1$
Set k = 0 — index of slot timing values $K_{1,k}$, in descending order of the slot timing values, in set $K_1$ for serving cell c
If the UE is not configured with the carrier aggregation slot offset parameter (e.g., 3GPP parameter ca-SlotOffset) for any serving cell of PDSCH receptions and the PUCCH transmission (e.g., the PUCCH containing HARQ-ACK information)
while k < ⟨$K_1$⟩
    if mod ($n_U - K_{1,k} + 1, \max(2^{\mu UL - \mu DL}, 1)$) = 0 or the HARQ-ACK codebook is configured with the
       subslot length parameter (for example, the UE is configured with the 3GPP parameter
       subslotLengthForPUCCH)
Set $n_D = 0$ — index of a downlink slot overlapping with an uplink slot (index of a downlink
    slot within the uplink slot), e.g., uplink slot $n_U - K_{1,k}$
Set $N_k$ to a number of downlink slots overlapping with uplink slot $n_U - K_{1,k}$ if the
    HARQ-ACK codebook is configured with the subslot length parameter, otherwise (if
    the HARQ-ACK codebook is not configured with the subslot length parameter), $N_k$ =
    $\max(2^{\mu DL - \mu UL}, 1)$
while $n_D < N_k$
    Set R to the set of rows, e.g., the set of rows configured by a TDRA table
    Set ⟨R⟩ to the cardinality of set R
    Set r=0 — index of row in set R
    if slot nU starts at a same time as or after a slot (or time) for an active downlink BWP
       change on serving cell c or an active uplink BWP change on the Pcell and slot
       $n_{0,k} + n_D$ is before the slot (or time) for the active downlink BWP change on
       serving cell c or the active uplink BWP change on the PCell, or the HARQ-ACK
       codebook is configured with the subslot length parameter, and downlink slot $n_{0,k} + n_D$
       $n_D$ overlaps with uplink slot nU - $K_{1,k-1}$, and k > 0, where slot $n_{0,k}$ is a
       downlink slot with a smallest index among downlink slots overlapping with uplink
       slot $n_U - K_{1,k}$ (or, within uplink slot $n_U - K_{1,k}$),
       $n_D = n_D + 1$;
    else
       while r < ⟨R⟩
          if the UE is not configured with a parameter enabling time domain HARQ
             bundling (e.g., 3GPP parameter enableTimeDomainHARQ-Bundling), and the
             UE is configured with tdd-UL-DL-ConfigurationCommon, or
             tdd-UL-DL-ConfigurationDedicated and, for each slot from slot
             $n_{0,k} - n_D - N_{PDSCH}^{repeat,max} + 1$ to slot no k + $n_D$, at least one symbol of the PDSCH time
             domain resource corresponding to row r is configured as uplink, where $K_{1,k}$ is
             the k-th slot timing value in set $K_1$, where slot $n_{0,k}$ is a downlink slot with a
             smallest index among downlink slots overlapping with uplink slot $n_U - K_{1,k}$
             (or, within uplink slot $n_U - K_{1,k}$),
          or HARQ-ACK information for the PDSCH corresponding to row r (e.g., PDSCH
             in slot $n_{0,k} + n_D$) cannot be reported (or transmitted) in slot $n_U$
             R = R\r ;
          elseif the parameter enabling time domain HARQ bundling parameter (e.g., 3GPP
             parameter enableTimeDomainHARQ-Bundling) is configured, and the UE is
             configured with tdd-UL-DL-ConfigurationCommon, or
             tdd-UL-DL-ConfigurationDedicated and, for each slot in slot $n_{0,k} + n_D - \Delta K_{0,r}$ (d),
             at least one symbol of the PDSCH time domain resource corresponding to row r
             of set R' is configured as uplink, where $K_{1,k}$ is the k-th slot timing value in set $K_1$,
             slot $n_{0,k}$ is a downlink slot with a smallest index among downlink slots overlapping

Pseudo code-12 with uplink slot $n_U - K_{1,k}$ (or, within uplink slot $n_U - K_{1,k}$), $\Delta K_{0,r}$ (d) is a difference
between a maximum value of K0 and K0 of an entry with an index of d of row r, and
$d = 0,1,...,C(\Delta K_{0,r}) - 1$
    R = R\r;
    R' = R'\r;
  else
    r = r + 1;
  end if
end while
if the UE does not indicate a capability to receive more than one unicast PDSCH per
    slot and R ≠ ∅,
    $M_{A,c} = M_{A,c} \cup j$;
    j = j + 1;
else
  Set ¢(R) to the cardinality of set R
  Set m to the smallest last OFDM symbol index, as determined by the SLIV,
    among all rows of R
  while R≠∅
    Set r=0
    while r < ¢(R)
      if S ≤ m for start symbol index S for row r
        $b_{r,k,n_D}$ = j; — index of occasion for candidate PDSCH reception or SPS
          PDSCH release for row r
        R = R\r;
        $B = B \cup b_{r,k,n_D}$;
      else
        r = r + 1;
      end if
    end while
    $M_{A,c} = M_{A,c} \cup j$;
    j = j + 1;
    Set m to the smallest last OFDM symbol index among all rows of R;
  end while
end if
$n_D = n_D + 1$;
  end if
  end while
end if
k = k + 1 ;
end while
else
while k < ¢($K_1$)

if $\mod\left(n_U - K_{1,k} + \left\lfloor \left(\frac{N_{slot,offset}^{UL}}{2^{\mu_{offset,UL}}} - \frac{N_{slot,offset,c}^{DL}}{2^{\mu_{offset,DL,c}}}\right) \cdot 2^{\mu_{UL}} \right\rfloor + 1, \max(2^{\mu_{UL}-\mu_{DL}}, 1)\right) = 0$ or the HARQ-ACK codebook is configured with the subslot length parameter
(for example, the UE is configured with the 3GPP parameter
subslotLengthForPUCCH)
Set $n_D = 0$ — index of a downlink slot overlapping with an uplink slot (index of a downlink
    slot within the uplink slot), e.g., uplink slot $n_U - K_{1,k}$
Set $N_k$ to a number of downlink slots overlapping with uplink slot $n_U - K_{1,k}$ if the
    HARQ-ACK codebook is configured with the subslot length parameter, otherwise (if
    the HARQ-ACK codebook is not configured with the subslot length parameter), $N_k$ =
    max ($2^{\mu_{DL}-\mu_{UL}}$, 1)
while $n_D < N_k$
  Set R to the set of rows, e.g., the set of rows configured by a TDRA table
  Set ¢(R) to the cardinality of set R
  Set r=0 — index of row in set R
  if slot $n_U$ starts at a same time as or after a slot (or time) for an active downlink BWP
    change on serving cell c or an active uplink BWP change on the PCell and slot
    $n_{0,k} + n_D$ is before the slot (or time) for the active downlink BWP change on
    serving cell c or the active uplink BWP change on the PCell, or the HARQ-ACK
    codebook is configured with the subslot length parameter, and downlink slot $n_{0,k}$ +
    $n_D$ overlaps with uplink slot $n_U - K_{1,k}$, and k > 0, where slot $n_{0,k}$ is a
    downlink slot with a smallest index among downlink slots overlapping with uplink
    slot $n_U - K_{1,k}$ (or, within uplink slot $n_U - K_{1,k}$),
    $n_D = n_D + 1$;
  else
    while r < ¢(R)
      if the UE is not configured with the parameter enabling time domain HARQ
        bundling (e.g., 3GPP parameter enableTimeDomainHARQ-Bundling), the UE
        is configured with tdd-UL-DL-ConfigurationCommon, or
        tdd-UL-DL-ConfigurationDedicated and, for each slot from slot $n_{0,k} + n_D -$
        $N_{PDSCH}^{repeat,max} + 1$ to slot $n_{0,k} + n_D$, at least one symbol of the PDSCH time
        domain resource corresponding to row r is configured as uplink, where $K_{1,k}$ is
        the k-th slot timing value in set K1, where slot $n_{0,k}$ is a downlink slot with a -continued Pseudo code-12

```
    smallest index among downlink slots overlapping with uplink slot n_U − K_{1,k}
       (or, within uplink slot n_U − K_{1,k}), or HARQ-ACK information for the PDSCH
       corresponding to row r (e.g., PDSCH in slot n_{0,k} + n_D) cannot be reported (or
       transmitted) in slot n_U
       R=R\r;
    elseif the parameter enabling time domain HARQ bundling (e.g., 3GPP parameter
       enableTimeDomainHARQ-Bundling) is configured, and the UE is configured
       with tdd-UL-DL-ConfigurationCommon, or
       tdd-UL-DL-ConfigurationDedicated and, for each slot in slot n_{0,k} + n_D −
       ΔK_{0,r}(d), at least one symbol of the PDSCH time domain resource
       corresponding to row r of set R' is configured as uplink, where K_{1,k} is the
       k-th slot timing value in set K_1 , slot n_{0,k} is a downlink slot with a smallest
       index among downlink slots overlapping with uplink slot n_U − K_{1,k} (or,
       within uplink slot n_U − K_{1,k}), ΔK_{0,r} (d) is a difference between a maximum
       value of K0 and K0 of an entry with an index of d of row r, and d =
       0,1,...,C(ΔK_{0,r}) − 1
       R = R\r;
       R' = R'\r;
    else
       r = r + 1 ;
    end if
 end while
 if the UE does not indicate a capability to receive more than one unicast PDSCH per
    slot and R ≠ ∅,
    M_{A,c} = M_{A,c} ∪ j;
    j = j + 1;
 else
    Set ℓ(R) to the cardinality of set R
    Set m to the smallest last OFDM symbol index, as determined by the SLIV,
       among all rows of R
    while R ≠ ∅
       Set r=0
       while r < ℓ(R)
          if S ≤m for start symbol index S for row r
             b_{r,k,n_D} = j; — index of occasion for candidate PDSCH reception or SPS
                PDSCH release for row r
             R=R\r;
             B = B∪b_{r,k,n_D} ;
          else
             r = r + 1;
          end if
       end while
       M_{A,c} = M_{A,c} ∪ j;
       j = j + 1;
       Set m to the smallest last OFDM symbol index among all rows of R;
    end while
 end if
 n_D = n_D + 1;
       end if
    end while
 end if
 k = k + 1 ;
end while
end if
```

What is claimed is:

1. A method performed by a terminal in a wireless communication system, the method comprising:
    receiving configuration information about a set of first slot timing values $K_1$, and configuration information on a time domain resource allocation table;
    based on a set of rows R of the time domain resource allocation table including more than one start and length indicator (SLIV) entry, updating the set of first slot timing values $K_1$ based on at least one of:
        a set of second slot timing values $K_0$ for a row r, wherein r is an index of a row in the set of rows R;
        a subcarrier spacing related parameter $\mu_{UL}$ for uplink, or
        a subcarrier spacing related parameter DL for downlink;
    determining a set of occasions for candidate physical downlink shared channel (PDSCH) reception based on the updated set of first slot timing values $K_1$ and the time domain resource allocation table; and
    transmitting hybrid automatic repeat request-acknowledgement (HARQ-ACK) codebook, wherein the HARQ-ACK codebook is determined based on the determined set of occasions for the candidate PDSCH reception.

2. The method of claim 1, wherein for transmitting the HARQ-ACK codebook, the method further comprises:
    determining one or more candidate uplink slots;
    determining corresponding candidate downlink slots for each of the one or more candidate uplink slots;
    deleting, for each of the candidate downlink slots, a row corresponding to a specific SLIV from the set of rows of the time domain resource allocation table, wherein each row of the set of rows of the time domain resource allocation table corresponds to a respective SLIV;

determining a set of non-overlapping valid PDSCHs for each slot of the candidate downlink slots, wherein a number of PDSCHs in the set of the non-overlapping valid PDSCHs is a maximum value of a number of the non-overlapping valid PDSCHs; and determining a size and an order of the HARQ-ACK codebook based on the set of the non-overlapping valid PDSCHs.

3. The method of claim 2, wherein determining the one or more candidate uplink slots is based on whether the terminal is configured with a parameter related to a subslot length.

4. The method of claim 3, wherein determining the one or more candidate uplink slots based on whether the terminal is configured with the parameter related to the subslot length comprises at least one of:

determining all uplink slots as the one or more candidate uplink slots, based on the terminal being configured with the parameter related to the subslot length; and determining the one or more candidate uplink slots based on whether a parameter related to a carrier aggregation slot offset is configured, based on the terminal being not configured with the parameter related to the subslot length.

5. The method of claim 2, wherein, when a candidate downlink slot overlaps with a plurality of candidate uplink slots, the candidate uplink slot corresponding to the candidate downlink slot is determined as at least one of:

one of an earliest uplink slot or a latest uplink slot in a time sequence from among the uplink slots overlapping with the determined candidate downlink slot, based on the terminal being configured with a parameter related to a subslot length;

an uplink slot with one of a smallest index or a largest index from among the uplink slots overlapping with the determined candidate downlink slot, based on the terminal being configured with the parameter related to the subslot length; and a candidate uplink slot with an index of $n_U - K_{1,k}$, wherein $n_U$ is an index of an uplink slot in which HARQ-ACK information is transmitted, $K_{1,k}$ is an entry from a set of first timing parameters, and k is an index of the entry from the set of the first timing parameters, and wherein the first timing parameters indicate a time interval between an uplink channel for transmitting HARQ-ACK information for a PDSCH and the PDSCH.

6. The method of claim 2, wherein the specific SLIV includes an invalid SLIV, and wherein an SLIV is determined as the invalid SLIV if the terminal is configured with a parameter related to a subslot length and an end of time domain resources of a PDSCH corresponding to the SLIV is not within any of uplink slots with an index of $n_U - K_{1,k}$, wherein $n_U$ is an index of an uplink slot in which the HARQ-ACK codebook is transmitted, $K_{1,k}$ is an entry from a set of first timing parameters, and k is an index of the entry from the set of the first timing parameters, and wherein the first timing parameters indicate a time interval between an uplink channel for transmitting the HARQ-ACK codebook for a PDSCH and the PDSCH.

7. The method of claim 1, wherein for transmitting the HARQ-ACK codebook the method further comprises:

extending a set of first timing parameters or extending a set of time domain resource allocation tables, wherein a first timing parameter of the extended set of the first timing parameters indicates a time unit interval between an uplink channel for transmitting the HARQ-ACK codebook for a PDSCH and the PDSCH; and transmitting the HARQ-ACK codebook based on the extended set of the first timing parameters or the extended set of the time domain resource allocation tables.

8. The method of claim 7, wherein extending of the set of the first timing parameters or extending of the set of the time domain resource allocation tables comprises:

for each row of the set of time domain resource allocation tables:

putting each entry of the row in a respective one or more of the extended set of the first timing parameters and the extended set of the time domain resource allocation tables, determining a first timing parameter for each respective entry in the extended set of the first timing parameters and the extended set of the time domain resource allocation tables, and putting the determined first timing parameter in the extended set of the first timing parameters;

determining the extended set of the first timing parameters based on an extended set of first timing parameters corresponding to all of the rows of the time domain resource allocation table; and determining the extended set of the time domain resource allocation tables based on a set of time domain resource allocation tables corresponding to all of the rows of the time domain resource allocation table.

9. The method of claim 7, wherein, for an SLIV of each row of the time domain resource allocation table, an extended set of first parameters is based on one or more of: the set of the first timing parameters, a set of second timing parameters corresponding to the each row, a maximum value of the second timing parameters for the each row, an uplink sub-carrier spacing (SCS) configuration, and a downlink SCS configuration, and wherein the second timing parameter indicates a time unit interval between a PDSCH scheduled by a downlink control information (DCI) and a PDCCH carrying the DCI.

10. The method of claim 9, wherein, for each SLIV of each row of the time domain resource allocation table, the extended set of the first parameters is based on:

$$K1' = (K_1 + \lceil \Delta K_0 \cdot 2^{\mu_{UL} - \mu_{DL}} \rceil) \cup (K_1 + \lfloor \Delta K_0 \cdot 2^{\mu_{UL} - \mu_{DL}} \rfloor))$$

wherein $K_1$ is the set of the first timing parameters, K1' is the extended set of the first parameters, $\Delta K_0$ is a difference between a maximum value of second timing parameters for the row and a second timing parameter for the SLIV, $\mu_{UL}$ is an uplink sub-carrier spacing (SCS) configuration parameter, and $\mu_{DL}$ is a downlink SCS configuration parameter.

11. The method of claim 7, further comprising:

determining, for each candidate PDSCH of one or more candidate PDSCHs in each downlink slot of one or more downlink slots corresponding to an uplink slot with an index of $n_U - K_{1,k}$, whether the candidate PDSCH can be transmitted in an uplink slot with an index of $n_U$, wherein $n_U$ is an index of an uplink slot in which the HARQ-ACK codebook is transmitted, $K_{1,k}$ is an entry from a set of first timing parameters, and k is an index of the entry from the set of the first timing parameters; and deleting a start and length indicator value (SLIV) corresponding to the candidate PDSCH from the time domain resource allocation table, based on the each candidate PDSCH being not able to be transmitted in the uplink slot with the index of $n_U$.

12. The method of claim 1, wherein for transmitting the HARQ-ACK feedback, the method further comprises:

bols configured by the higher layer signaling, and a last repetition of repetitions within a downlink slot overlaps with the uplink symbols configured by the higher layer signaling.

15. The method of claim 1, further comprising:
updating the set of rows R, and the set of first slot timing values $K_1$ based on the set of rows including more than one SLIV entry, according following pseudo-code:

```
Set R to the set of rows
Set C(R) to the cardinality of R
Set r = 0 — index of row in set R
Set R_T = ∅
Set K_1T = ∅
while r < C(R)
    Set P_r to the set of entries for row r
    Set K_0,r to the set of K_0 values for entries for row r
    Set                            Set ΔK_0,r = max(K_0,r) − K_0,r
                                                K_0
    Set C(P_r) to the cardinality of P_r
    Set C(ΔK_0,r) to the cardinality of ΔK_0,r
    Set p = 0 — index of element in P_r
    set d = 0 — index of element in ΔK_0,r
    while p < C(P_r)
        R_T = R_T ∪ P_r(p);
        p = p + 1;
    end while
    while d < C(ΔK_0,r)
        K_1T = K_1T ∪((K_1 + ⌈ΔK_0,r,d · 2^{μUL−μDL}⌉) ∪ (K_1 + ⌊ΔK_0,r,d · 2^{μUL−μDL}⌋));
        d = d + 1;
    end while
    r = r + 1;
end while
K_1 = K_1T;.
``` determining, for each row of a time domain resource allocation table that corresponds to a respective SLIV, whether the respective SLIV is a specific SLIV;
deleting the respective SLIV to update the time domain resource allocation table, based on the respective SLIV being the specific SLIV; and
transmitting the HARQ-ACK codebook based on the updated time domain resource allocation table.

13. The method of claim 12, wherein the specific SLIV includes an invalid SLIV, and
wherein the respective SLIV is determined to be the invalid SLIV based on at least one of that:
the terminal is configured with a parameter related to a subslot length, and an end of time domain resources of a PDSCH corresponding to the SLIV is not within any of uplink slots with an index of $n_U - K_{1,k}$, wherein $n_U$ is an index of an uplink slot in which the HARQ-ACK codebook is transmitted, $K_{1,k}$ is an entry from a set of first timing parameters, and k is an index of the entry from the set of the first timing parameters; and
at least two repetitions of a PDSCH that corresponds to a row corresponding to the SLIV in the table within a downlink slot or all repetitions of the PDSCH overlap with uplink symbols configured by higher layer signaling.

14. The method of claim 1, wherein:
the terminal does not predict at least one of: any repetition of repetitions within a downlink slot overlaps with uplink symbols configured by higher layer signaling, a first repetition of repetitions within a downlink slot overlaps with the uplink symbols configured by the higher layer signaling, a second repetition of repetitions within a downlink slot overlaps with the uplink sym- 16. A terminal in a wireless communication system, the terminal comprising:
a transceiver; and
a processor coupled to the transceiver, wherein the processor is configured to:
receive configuration information about a set of first slot timing values $K_1$, and configuration information on a time domain resource allocation table;
based on a set of rows R of the time domain resource allocation table including more than one start and length indicator (SLIV) entry, updating the set of first slot timing values $K_1$ based on at least one of:
a set of second slot timing values $K_0$ for a row r, wherein r is an index of a row in the set of rows R;
a subcarrier spacing related parameter $\mu_{UL}$ for uplink, or a subcarrier spacing related parameter $\mu_{DL}$ for downlink;
determine a set of occasions for candidate for physical downlink shared channel (PDSCH) reception based on the updated set of first slot timing values $K_1$ and the time domain resource allocation table;
transmit hybrid automatic repeat request-acknowledgement (HARQ-ACK) codebook, wherein the HARQ-ACK codebook is determined based on the determined set of occasions for the candidate PDSCH reception.

17. The terminal of claim 16, wherein for transmitting the HARQ-ACK codebook, the processor is configured to:
determine one or more candidate uplink slots;
determine corresponding candidate downlink slots for each of the one or more candidate uplink slots;
delete, for each of the candidate downlink slots, a row corresponding to a specific SLIV from the set of rows of the time domain resource allocation table, wherein each row of the set of rows of the time domain resource allocation table corresponds to a respective SLIV;

determine a set of non-overlapping valid PDSCHs for each slot of the candidate downlink slots, wherein a number of PDSCHs in the set of the non-overlapping valid PDSCHs is a maximum value of a number of the non-overlapping valid PDSCHs; and determine a size and an order of the HARQ-ACK codebook based on the set of the non-overlapping valid PDSCHs.

18. The terminal of claim 16, wherein for transmitting the HARQ-ACK codebook, the processor is configured to:

extend a set of first timing parameters or extend a set of time domain resource allocation tables, wherein a first timing parameter of the extended set of the first timing parameters indicates a time unit interval between an uplink channel for transmitting the HARQ-ACK codebook for a PDSCH and the PDSCH; and perform the HARQ-ACK feedback based on the one of the extended set of the first timing parameters and the extended set of the time domain resource allocation tables.

19. The terminal of claim 16, wherein for transmitting the HARQ-ACK codebook, the processor is configured to:

determine, for each row of a time domain resource allocation table that corresponds to a respective start and length indicator value (SLIV), whether the respective SLIV is a specific SLIV;

delete the respective SLIV to update the time domain resource allocation table, based on the respective SLIV being the specific SLIV; and transmitting the HARQ-ACK codebook based on the updated time domain resource allocation table.

20. The terminal of claim 19, wherein the processor is further configured to:

update the set of rows R, and the set of slot timing values $K_1$ based on the set of rows including more than SLIV entry, according following pseudo-code:

```
Set R to the set of rows
Set C(R) to the cardinality of R
Set r = 0 – index of row in set R
Set R_T = Ø
Set K_{1T} = Ø
while r < C(R)
    Set P_r to the set of entries for row r
    Set K_{0,r} to the set of K_0 values for entries for row r Set ΔK_{0,r} = max(K_{0,r}) – K_{0,r}
                   K_0

Set C(P_r) to the cardinality of P_r
    Set C(ΔK_{0,r}) to the cardinality of ΔK_{0,r}
    Set p = 0 – index of element in P_r
    set d = 0 – index of element in ΔK_{0,r}
    while p < C(P_r)
        R_T = R_T ∪ P_r(p);
        p = p + 1;
    end while
    while d < C(ΔK_{0,r})
        K_{1T} = K_{1T} ∪ ((K_1 + ⌈[ΔK_{0,r,d} · 2^{μUL−μDL}⌉) ∪ (K_1 +
            ⌊ΔK_{0,r,d} · 2^{μUL−μDL}⌋));
        d = d + 1;
    end while
    r = r + 1;
end while
K_1 = K_{1T}.
```

* * * * *